United States Patent
Ode et al.

(10) Patent No.: US 8,472,958 B2
(45) Date of Patent: Jun. 25, 2013

(54) WIRELESS TELECOMMUNICATION SYSTEM, TRANSMITTER AND RECEIVER, TRANSMITTING AND RECEIVING A PLURALITY OF DATA STREAMS

(75) Inventors: Takayoshi Ode, Kawasaki (JP); Kazuo Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 120 days.

(21) Appl. No.: 12/544,536

(22) Filed: Aug. 20, 2009

(65) Prior Publication Data

US 2010/0040161 A1 Feb. 18, 2010

Related U.S. Application Data

(63) Continuation of application No. 11/302,186, filed on Dec. 14, 2005, now Pat. No. 7,636,583.

(30) Foreign Application Priority Data

Sep. 9, 2005 (JP) ................................. 2005-262308

(51) Int. Cl.
*H04W 36/00* (2009.01)

(52) U.S. Cl.
USPC ............. 455/436; 455/442; 455/444; 455/69; 455/522; 455/562.1; 455/130; 455/439; 455/332; 455/132; 455/24; 370/342; 370/362; 370/335; 370/341; 370/334; 375/130; 375/260; 375/295; 375/316

(58) Field of Classification Search
USPC ................... 455/442, 444, 69, 522, 552, 436, 455/562.1, 130, 439, 332, 132, 24; 370/342, 370/362, 335, 130, 334, 336, 341; 375/130, 375/260, 295, 316
See application file for complete search history.

(56) References Cited

U.S. PATENT DOCUMENTS

| | | | |
|---|---|---|---|
| 6,473,624 B1 * | 10/2002 | Corbett et al. ................ | 455/522 |
| 6,597,705 B1 | 7/2003 | Rezaiifar et al. | |
| 6,741,587 B2 * | 5/2004 | Holma et al. ................ | 370/362 |
| 7,069,050 B2 * | 6/2006 | Yoshida .................... | 455/562.1 |
| 7,095,709 B2 * | 8/2006 | Walton et al. ................ | 370/208 |

(Continued)

FOREIGN PATENT DOCUMENTS

| | | |
|---|---|---|
| CN | 1326622 A | 12/2001 |
| CN | 1604497 A | 4/2005 |

(Continued)

OTHER PUBLICATIONS

"European Extended Search Report", mailed in connection with corresponding EP appln. No. 09168423.3, on Dec. 2, 2009.

(Continued)

*Primary Examiner* — April G Gonzales
(74) *Attorney, Agent, or Firm* — Fujitsu Patent Center

(57) ABSTRACT

In a wireless telecommunication system for transmitting a plurality of streams from a base transmission station comprising a plurality of antennas to a mobile station comprising a plurality of antennas, the base transmission station respectively transmits, by way of a plurality of the antennas, each stream obtained by dividing data to be transmitted. The mobile station respectively receives each stream by utilizing the plurality of antennas. A measurement unit respectively measures a reception quality or received power from each antenna relating to a stream. A changeover unit carries out a handover for each stream according to a measurement result by the measurement unit.

15 Claims, 36 Drawing Sheets

U.S. PATENT DOCUMENTS

| | | | |
|---|---|---|---|
| 7,372,912 B2 * | 5/2008 | Seo et al. | 375/267 |
| 7,636,583 B2 * | 12/2009 | Ode et al. | 455/522 |
| 2002/0173302 A1 * | 11/2002 | Baker et al. | 455/422 |
| 2003/0235147 A1 * | 12/2003 | Walton et al. | 370/204 |
| 2004/0171384 A1 * | 9/2004 | Holma et al. | 455/436 |
| 2008/0125154 A1 | 5/2008 | Zirwas et al. | |

FOREIGN PATENT DOCUMENTS

| | | |
|---|---|---|
| CN | 1635819 A | 7/2005 |
| CN | 1653828 | 8/2005 |
| JP | 2000-509565 | 7/2000 |
| JP | 2003-304569 | 10/2003 |
| JP | 2003-338781 | 11/2003 |
| JP | 2004-056509 | 2/2004 |
| JP | 2004-72624 | 3/2004 |
| JP | A-2004-72624 | 3/2004 |
| JP | 2004-229088 | 8/2004 |
| JP | 2008-543141 | 11/2008 |
| WO | WO 97/15159 | 4/1997 |
| WO | WO-01/76110 | 10/2001 |
| WO | WO 01/99291 | 12/2001 |
| WO | WO-03/084253 | 10/2003 |
| WO | WO 2004/029829 | 4/2004 |

OTHER PUBLICATIONS

Office Action mailed by the State Intellectual Property Office of China, May 8, 2009, regarding CN App. No.: 200610000361.1.

Office Action mailed by the Korean Patent Office, Nov. 24, 2008, regarding KR App. No. 10-2007-71483. (Partial English-language translation is provided).

Office Action mailed by the Korean Patent Office, Feb. 3, 2009, regarding KR App. No. 10-2007-71483. (English-language translation is provided).

Office Action mailed by the Korean Patent Office, Nov. 17, 2006, regarding KR App. No. 10-2005-133752. (English-language translation is provided).

3GPP Orginisational Partners, 3GPP Technical Specification 25.211 Version 5.7.0, Release 5, (Jun. 2005).

UMTS; ETSI Technical Specification 125 211 v6.5.0 (Jun. 2005) XP-014030538.

Japanese Office Action for Japanese Application No. 2005-262308 mailed on Sep. 28, 2010. An English-language Translation is provided.

USPTO, Notice of Allowance and Notice of Allowability, Aug. 27, 2009, in parent U.S. Appl. No. 11/302,186 [now US Patent 7,636,583].

USPTO, Final Rejection, Jan. 7, 2009, in parent U.S. Appl. No. 11/302,186 [now US Patent 7,636,583].

USPTO, Non-Final Rejection, Jun. 12, 2008, in parent U.S. Appl. No. 11/302,186 [now US Patent 7,636,583].

"Chinese Office Action" mailed by CPO and corresponding to Chinese application No. 201010175857.9 on Feb. 13, 2012, with partial English translation.

Chinese Office Action mailed Sep. 29, 2012 for corresponding Chinese Application No. 201010175857.9, with English-language Translation.

* cited by examiner

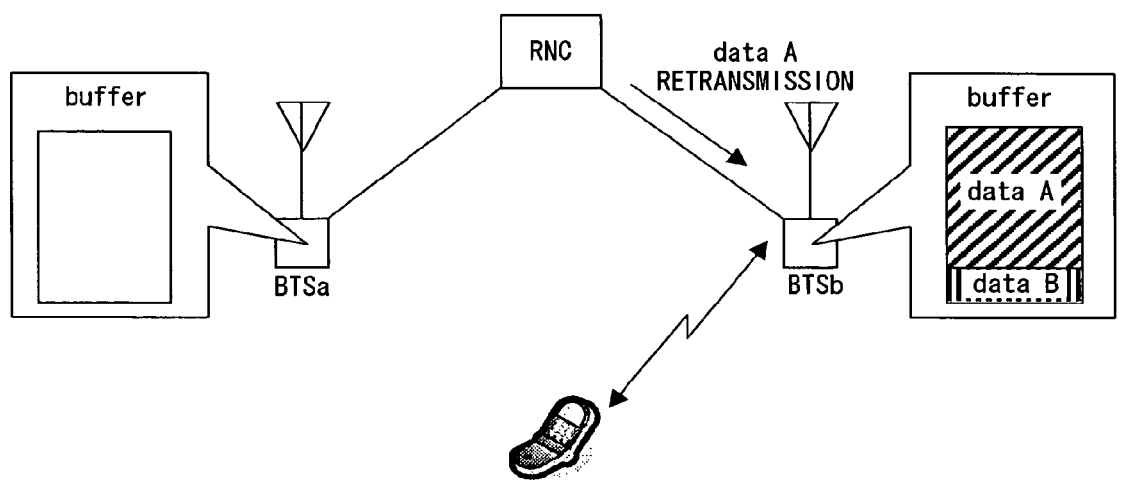
F I G. 1 0

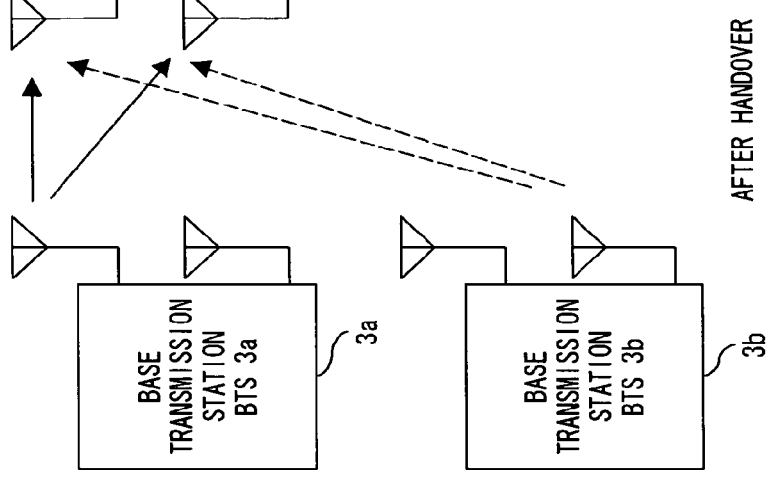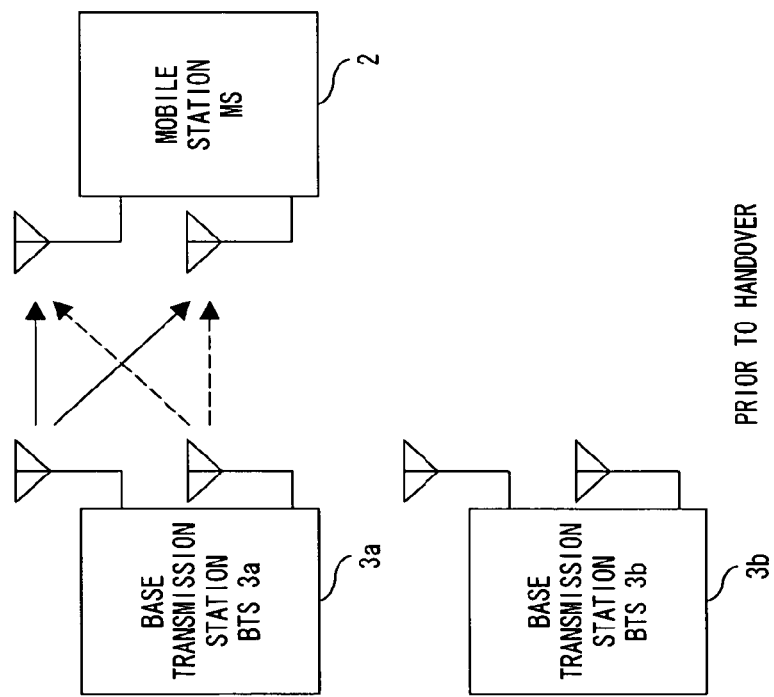
FIG. 12

| HO CARRY-OUT INFORMATION FOR EACH STREAM | TARGET STATION INFORMATION | CURRENT STATION INFORMATION | HO TIMING INFORMATION |
|---|---|---|---|

FIG. 19

| STREAM NUMBER | 1 | 2 | 3 | 4 | 5 | 6 | CODE |
|---|---|---|---|---|---|---|---|
| EXAMPLE 1 | ○ | × | ○ | × | ○ | ○ | 101011 |
| EXAMPLE 2 | × | × | ○ | × | × | × | 001000 |

FIG. 20A

| STREAM NUMBER | 1 | 2 | 3 | 4 | 5 | 6 |
|---|---|---|---|---|---|---|
| EXAMPLE 1 | 120 | 0 | 121 | 0 | 120 | 121 |
| EXAMPLE 2 | 0 | 0 | 23 | 0 | 0 | 0 |

FIG. 20B

| STREAM NUMBER | 1 | 2 | 3 | 4 | 5 | 6 |
|---|---|---|---|---|---|---|
| EXAMPLE 1 | 1 | 0 | 1 | 0 | 1 | 1 |
| EXAMPLE 2 | 0 | 0 | 1 | 0 | 0 | 0 |

FIG. 20C

| STREAM NUMBER | 1 | 2 | 3 | 4 | 5 | 6 |
|---|---|---|---|---|---|---|
| EXAMPLE 1 | 20 | 0 | 20 | 0 | 18 | 22 |
| EXAMPLE 2 | 0 | 0 | 10 | 0 | 0 | 0 |

FIG. 20D

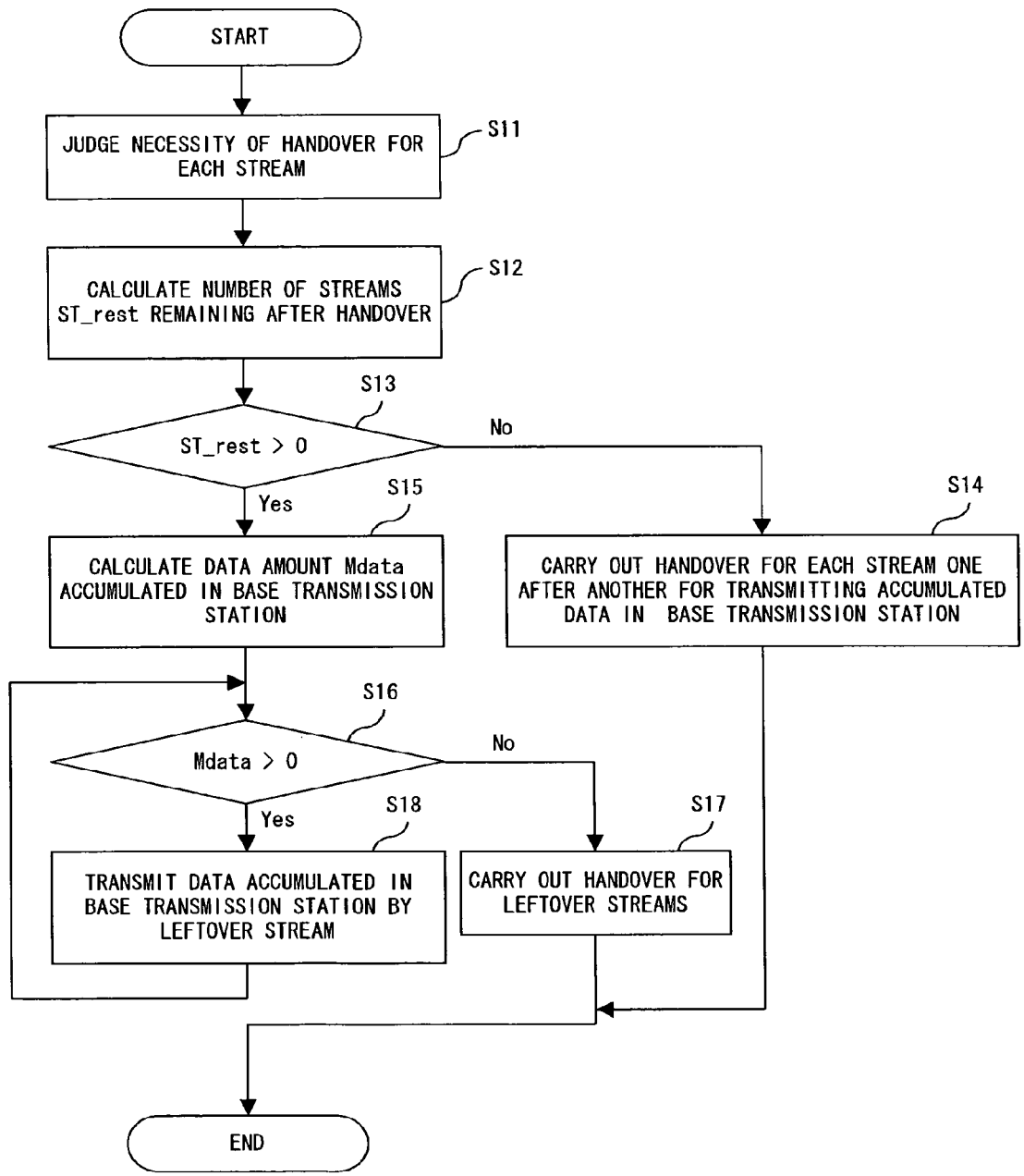
F I G. 2 1

| STREAM | SELECTED BASE TRANSMISSION STATION |
|---|---|
| $ST_1$ | $BTS_{3a}$ |
| $ST_2$ | $BTS_{3b}$ |
| $ST_3$ | $BTS_{3b}$ |
| $ST_4$ | $BTS_{3b}$ |
| . . . . | . . . . |
| $ST_{m-1}$ | $BTS_{3a}$ |
| $ST_m$ | $BTS_{3c}$ |

FIG. 27A

| STREAM | RECEIVED POWER |
|---|---|
| $ST_1$ | $P_{bts3b\_st1}$ |
| $ST_2$ | $P_{bts3b\_st2}$ |
| $ST_3$ | $P_{bts3b\_st3}$ |
| $ST_4$ | $P_{bts3b\_st4}$ |
| . . . . | . . . . |
| $ST_{m-1}$ | $P_{bts3b\_stm-1}$ |
| $ST_m$ | $P_{bts3b\_stm}$ |

FIG. 27B

WIRELESS TELECOMMUNICATION SYSTEM, TRANSMITTER AND RECEIVER, TRANSMITTING AND RECEIVING A PLURALITY OF DATA STREAMS

RELATED APPLICATIONS

This application is a continuing application under 37 C.F.R. §1.53(b) of U.S. patent application Ser. No. 11/302,186, filed Dec. 14, 2005, now U.S. Pat. No. 7,636,583 which claims the benefit of priority under 35 U.S.C. §119 to Japanese Patent Application No. 2005-262308, filed Sep. 9, 2005, which application, in its entirety, is incorporated by reference herein.

BACKGROUND OF THE INVENTION

1. Field of the Invention

The present invention relates to an MIMO (multiple input multiple output) transmission technology for transmitting a plurality of streams by way of a plurality of antennas.

2. Description of the Related Art

In a wireless telecommunication system, mobile terminals (i.e., terminals) are enabled to continue a telecommunication if a received power, et cetera, is reduced by selectively changing a connected base station over to an optimal one based on a received power, a reception quality, et cetera, from surrounding base stations (e.g., refer to patent documents 1, 2, 3 and 4; and a non-patent document 1). An example of a wireless telecommunication system is the recently propagated W-CDMA (Wideband Code Division Multiple Access) system.

FIG. 1 exemplifies a configuration of a telecommunication system adopting the W-CDMA system. The terminal (i.e., a mobile station, MS) receives signals from a plurality of base transmission stations (BTS) $BTS_a$, $BTS_b$, $BTS_c$ through $BTS_n$. The mobile station selects a base transmission station with the largest received power as the optimal base transmission station for the telecommunication from among the plurality thereof to connect to a network via the selected base transmission station. If a received power from a nearby base transmission station (i.e., adjacent base transmission station) becomes larger than that from the connected base transmission station as a result of the mobile station moving for example, a handover, i.e., changing the connected base transmission station to the nearby one, is carried out for a continued telecommunication. A handover is also carried out according to the telecommunication environment in the case of transmitting and receiving a plurality of data streams simultaneously between a base transmission station and mobile station by utilizing the MIMO technique. The following description is of a handover processing utilizing the MIMO technique in a wireless telecommunication system adopting the HSDPA (high speed downlink packet access) as one standard specification of W-CDMA.

FIG. 2 shows an overview of a handover processing according to the conventional technique; illustrating a handover processing in a downlink transmission under the HSDPA system 100, that is, in a data transmission from the base transmission stations to a mobile station. In the example of FIG. 2, a 2 by 2 antenna configuration is structured between a base transmission station and a mobile station.

Prior to a handover, a mobile station 102 receives a data stream via a base transmission station 103A as shown by FIG. 2 (a). As the received power from a base transmission station 103B becomes larger than that of the base transmission station 103A at the mobile station 102, a handover processing changes the base transmission station 103A to the base transmission station 103B with a larger received power, as the base transmission station for transmitting a data stream over, as shown by FIG. 2 (b). In this event, the two data streams transmitted from the base transmission station 103A are simultaneously changed over. The handover processing results in the mobile station 102 receiving two data streams via the base transmission station 103B.

FIGS. 3, 4A and 4B exemplify respective configurations of a receiving apparatus and a transmission apparatus according to the conventional technique. Here, the mobile station 102 is a receiving apparatus, while the base transmission station 103 is the transmission apparatus. And in the examples of FIGS. 3, 4A and 4B, the mobile station 102 and the base transmission station 103 comprise, respectively, three antennas, for transmission and reception, thereby configured to transmit and receive three data streams simultaneously. Incidentally, antennas (i.e., $Tx_1$ through $Tx_3$; and $Rx_1$ through $Rx_3$), utilized for transmitting the data stream from the base transmission station 103 to the mobile station 102, are delineated separately from antennas (i.e., $Tx_0$ and $Rx_0$) for transmitting a signal from the mobile station 102 to the base transmission station 103, for ease of viewing of FIGS. 3, 4A and 4B. But each antenna is used both for transmitting and receiving signals in the actual structure. That is, the antenna $Tx_0$ comprised by the mobile station 102 is achieved by a discretionary one or a plurality of the antennas $Rx_1$ through $Rx_3$, and likewise the antenna $Rx_0$ comprised by the base transmission station 103 is achieved by a discretionary one or a plurality of the antennas $Tx_1$ through $Tx_3$. Note that this also applies to those drawings herein where the transmission and reception antennas are separately delineated in the following descriptions.

The conventional mobile station 102 as shown by FIG. 3 comprises three antennas $Rx_1$, $Rx_2$ and $Rx_3$, and the corresponding receiver units 111A, 111B and 111C. Received power measurement units 112A, 112B and 112C measure the received power from each base transmission station 103 at the respective receiver units 111A, 111B and 111C. A handover judgment unit 113 calculates the total received power, i.e., a sum of the received power at each base transmission station based on the measurement result at each received power measurement unit 112 and judges whether a handover is to be carried out or not.

In the conventional base transmission station 103 as shown by FIG. 4A, the antenna $Rx_0$ receives handover control information transmitted from the antenna $Tx_0$ of the mobile station 102. The received information is provided to a handover control signal extraction unit 131 by way of the receiver unit. The handover control signal is transmitted to an upper level control station, that is, a radio network controller (RNC) in the HSDPA system 100.

FIG. 4B shows a configuration, relating to a handover processing, of an RNC as the upper level station of a base transmission station 103. As a handover signal is transmitted from the base transmission station 103 to the RNC, a handover control unit thereof determines a timing for carrying out a handover A handover control unit 132 of the base transmission station 103 carries out a handover by receiving a notification from the RNC.

FIG. 5 shows a process procedure of a handover in the conventional system. The first step is to measure a received power from each base transmission station (S101), compare the total received power from the surrounding base transmission station of the mobile station 102 (S102), judge whether or not a handover is to be carried out based on the comparison result and, if it is judged that a handover is to be carried out, determine which base transmission station is to be handed over to (S103).

FIG. 6 is a flow chart showing a definite measurement process of a received power as a part of the conventional handover processing. In the example shown by FIG. 6, the n-number of base transmission stations exist in the surrounding area of the mobile station, and each terminal station is equipped by the m-number of antennas respectively. Meanwhile, it is defined that a received power of a signal from the base transmission station of a base transmission station number j is $P_j$ and that the power received by the antenna $A_x$ is $P_{rx}$.

In the measurement process of a received power, initialize the antenna number, the base transmission station number and the received power from each base transmission station (S111), increment the base transmission station number j and the antenna number i, by one, respectively (S112 and S113) and add the received power $P_{rx}$ when receiving a signal from each base transmission station via each antenna Ai and acquire the sum of the received power (S114, S115 and S116). The sum of received powers is acquired for the n-number of base transmission stations, respectively (S117).

In the conventional handover processing, the necessity of a handover is judged based on the sum of the received powers and when the base transmission stations are changed over from the current base transmission station to a target base transmission station for transmitting a data stream, the data stream is transmitted via a different base transmission station pre- and post- the handover, as shown by FIGS. 5 and 6.

FIG. 7 illustrates data transmission pre- and post- a handover according to the conventional technique. The handover is defined as the mobile station 102 moving from under the base transmission station $BTS_1$ to the $BTS_h$. As shown by FIG. 7 (a), the base transmission station $BTS_1$ transmits data prior to a handover and, when the upper level control station, i.e., an RNC, carries out a handover at a prescribed timing, it cuts off the path between the RNC and base transmission station $BTS_1$ and instead establishes a path between the RNC and another base transmission station $BTS_h$. As shown by FIG. 7 (b), the data is then transmitted via the post-handover base transmission station $BTS_h$, leaving data accumulated in the base transmission station $BTS_1$ prior to the handover un-transmitted.

If the accumulated data in the base transmission station $BTS_1$ as shown by FIG. 7 is left un-transmitted, the mobile station 102 is unable to receive all the data. In order to prevent such a loss of data from occurring, a data transfer or a retransmission has been carried out in the conventional technique.

FIGS. 8 through 11 describe the processing for preventing a data loss at a handover occurrence of the conventional system. In FIGS. 8 through 11, definitions for designations are as follows: a current base transmission station (i.e., the station which hands a terminal over): $BTS_a$, a target base transmission station (i.e., the station which a terminal is handed over to): $BTS_b$, the data delivered to the $BTS_a$ and $BTS_b$ are data A and data B, respectively.

FIG. 8 describes a state of a buffer at each base transmission station prior to a handover. A radio network controller RNC, i.e., the upper level control station of a base transmission station, transmits data to the mobile station via the connected $BTS_a$. The data A is accumulated in the buffer of the $BTS_a$.

FIG. 9 describes a state of the buffer at each base transmission station immediately after carrying out a handover in the case of retransmitting data after the handover. After carrying out a handover, the mobile station 102 connects itself to a network via the $BTS_b$. The buffer of the $BTS_b$ accumulates the data B after carrying out a handover. Meanwhile, the data A which has been delivered to the $BTS_a$ before carrying out the handover ends up remaining in the buffer thereof.

FIG. 10 describes a data retransmission processing by the upper level control station. As shown by FIG. 9, the data A is the data transmitted to the current base transmission station $BTS_a$ prior to the handover and accumulated in the buffer. The RNC, i.e., the upper level control station, receiving a request from a mobile station 102, retransmits the data A accumulated in the $BTS_a$ to the $BTS_b$, that is, the target base transmission station, while the data A in the $BTS_a$ is discarded. In the $BTS_b$, a signal exchange between the mobile station 102 and RNC is conducted for a retransmission control prior to a retransmission processing of the data A, followed by retransmitting the data A. An exchange of a retransmission control signal and the actual retransmission processing are time consuming.

FIG. 11 describes a state of a buffer at each base transmission station immediately after carrying out a handover in the case of transferring data after the handover. This method transfers, to the $BTS_b$ via the RNC, data A accumulated in a buffer of the $BTS_a$, as a result of a handover. Similarly, for such a transfer, an exchange of a control signal and actual transfer processing are time consuming as with the data retransmission processing shown by FIG. 10.

As described by referring to FIGS. 8 through 11, since a plurality of data streams simultaneously transmitted are changed over at the same time in the conventional technique, a data loss occurs in a mobile station 102 unless the data accumulated in the buffer of a current base transmission station is retransmitted or transferred to the mobile station 102. There is a problem of a handover process being time consuming as much as the processing of retransmitting or transferring the data taking time, hence resulting in a decreased transmission speed.

Meanwhile, in a system for wirelessly and simultaneously transmitting mutually independent data streams respectively from a plurality of transmission systems by using the same frequency, as a MIMO related technique, there is a technique for wirelessly transmitting a transmission data stream simultaneously by using the same frequency, respectively, from a plurality of transmission systems, following changing over from a mutually independent plurality of data streams to a plurality of sub-streams, if a received power of a mobile station (or a reception quality) assumes a prescribed threshold value or less. According to such a technique, a MIMO transmission is carried out if a mobile station exists in the neighborhood of a base transmission station with a relatively large received power, while a diversity transmission is performed if a mobile station exists in an area of a relatively low received power. In the neighborhood of the two areas, a changeover between the MIMO transmission and the diversity transmission is conducted.

[Patent document 1] laid-open Japanese patent application publication No. 2004-72624
[Patent document 2] laid-open Japanese patent application publication No. 2003-338781
[Patent document 3] laid-open Japanese patent application publication No. 2004-229088
[Patent document 4] laid-open Japanese patent application publication No. 2005-509565
[Non-patent document 1] 3GPP Specification: 25.211 Rel-5, Version 5.7.0, [online], Aug. 2, 2005, 3GPP, searched on Aug. 3, 2005, Internet <URL: http://www.3gpp.org/ftp/Specs/html-info/25211.htm>

SUMMARY OF THE INVENTION

The purpose of the present invention is to shorten the time required for a handover, thereby preventing a decreased transmission speed at the time of carrying out a handover.

In order to solve the above described problem, the present invention provides a wireless telecommunication system for transmitting a plurality of streams from a transmission apparatus comprising a plurality of antennas to a receiving apparatus, comprising a transmission unit, being equipped in the transmission apparatus, for transmitting a plurality of streams, a receiving unit, being equipped in the receiving apparatus, for receiving individually each stream transmitted from the transmission unit, a measurement unit for measuring respectively a reception quality or a received power from the transmission unit relating to each stream, and a changeover unit for carrying out a handover for each of the streams according to a measurement result of the measurement unit.

Each receiving unit measures a reception quality and received power transmitted from a transmission unit for each stream. A handover is carried out in the unit of a stream if the result of a measurement indicates that it is preferable that a handover is carried out. A discard, transfer or retransmission process for data at the current base station is no longer required, hence shortening the time required for a data transmission.

Or, it may further comprise a judgment unit for judging whether or not it is necessary to carry out a handover by comparing a reception quality or received power relating to a stream from a first transmission unit in a first transmission apparatus being used for a telecommunication with a reception quality or received power, respectively, relating to a stream from a second transmission unit in a second transmission apparatus, wherein said changeover unit changes a transmission unit used for a telecommunication for a stream from the first transmission unit to the second transmission unit, if it is judged as necessary to carry out a handover.

Furthermore, it may be configured in such a manner that said judgment unit judges that it is necessary to carry out a handover if a reception quality or received power relating to a stream from said second transmission unit assumes a predetermined threshold value or greater, respectively, as compared to a reception quality or received power relating to the stream from said first transmission unit.

And the present invention provides a transmitter comprising a plurality of antennas for transmitting a plurality of streams, comprising a transmission unit for transmitting a plurality of streams, and a changeover unit for carrying out a handover for each stream according to respective measurement results of a reception quality or received power from the transmission unit relating to each stream.

Moreover, the present invention provides a receiver for receiving a plurality of data streams, comprising a receiving unit for receiving a plurality of streams transmitted from a first and a second transmitter, a measurement unit for respectively measuring a reception quality or received power from the transmitter relating to each stream, and a signal reproduction unit for reproducing a signal from one or more streams transmitted from the first transmitter and one or more streams transmitted from the second transmitter if it is judged that it is necessary to carry out a handover to the second transmitter, for a fraction of streams among a plurality thereof transmitted from the first transmitter, based on a measurement result of the measurement unit.

According to the present invention, once a handover is carried out for each of the data stream, there is no need for a current transmission apparatus to discard, retransmit or transfer data, and therefore it is possible to shorten the time required for the handover processing. Shortening the time required for the handover processing prevents a reduced transmission speed at the time of carrying out a handover.

BRIEF DESCRIPTION OF THE DRAWINGS

FIG. 10 describes a data retransmission processing by an upper level control station;

FIG. 12 is a conceptual diagram of a handover method according to the present invention;

FIG. 19 exemplifies a data structure of handover information;

FIG. 20A is an actual example of handover information (part 1);

FIG. 20B is an actual example of handover information (part 2);

FIG. 20C is an actual example of handover information (part 3);

FIG. 20D is an actual example of handover information (part 4);

FIG. 21 is a flow chart of transmission processing for accumulated data in a current base transmission station;

FIG. 27A exemplifies a selected target base transmission station;

FIG. 27B exemplifies a received power from a target base transmission station for each stream;

DESCRIPTION OF THE PREFERRED EMBODIMENTS

Figure 1:
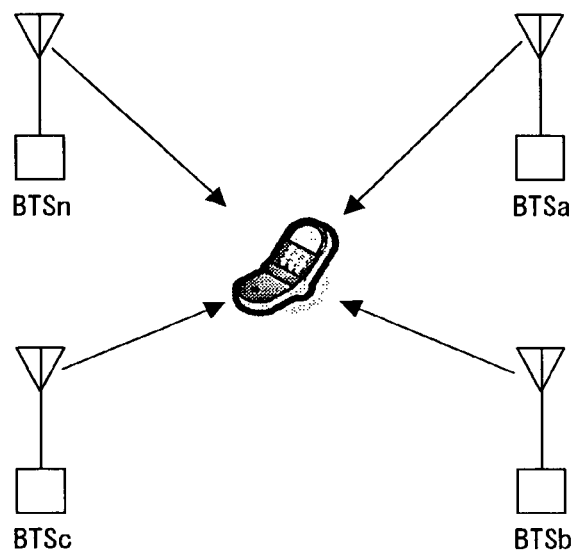
FIG. 1 exemplifies a configuration of a telecommunication system adopting the W-CDMA system.
Figure 2:
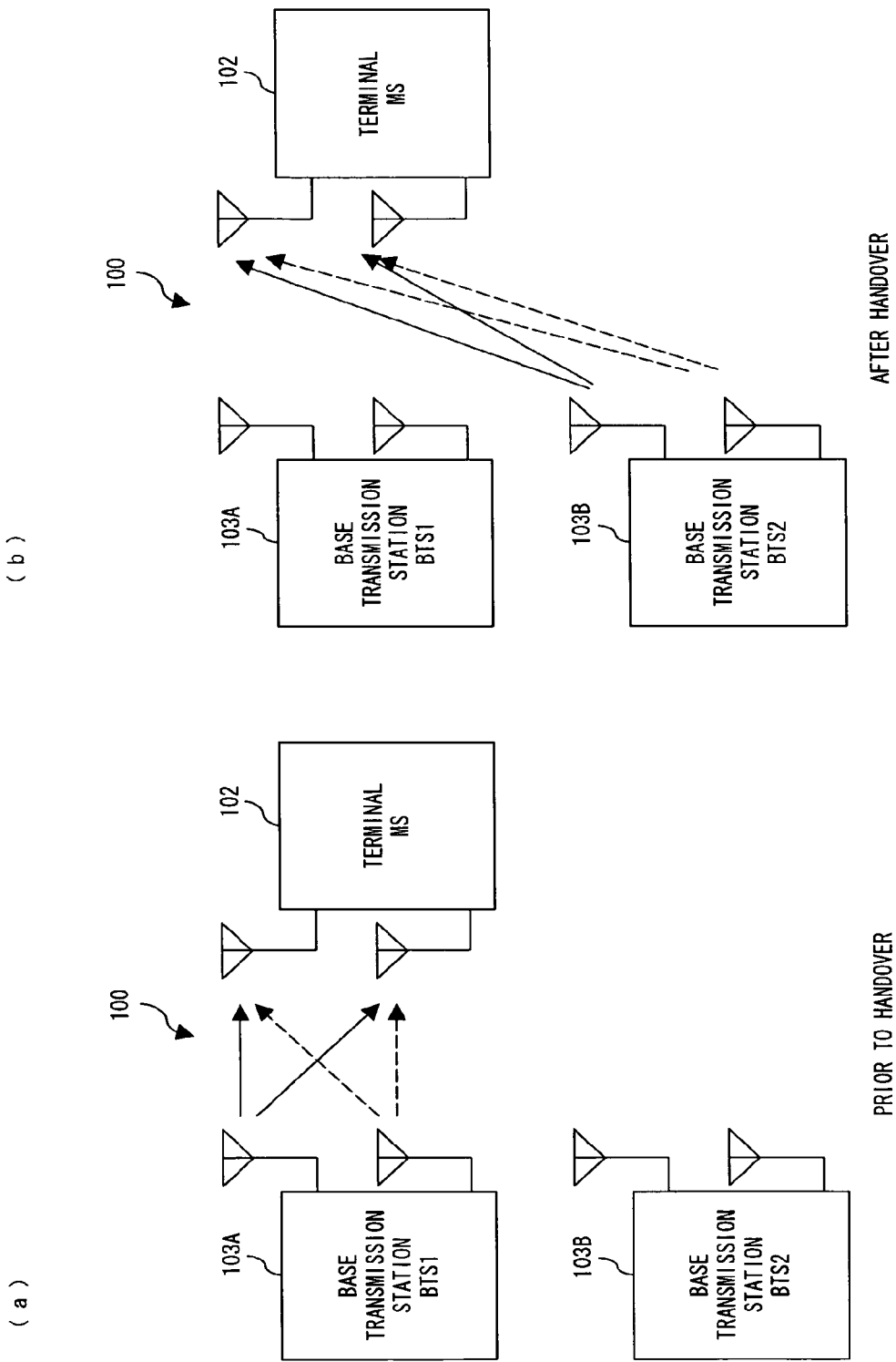
FIG. 2 shows a summary of a handover processing according to the conventional technique.
Figure 3:
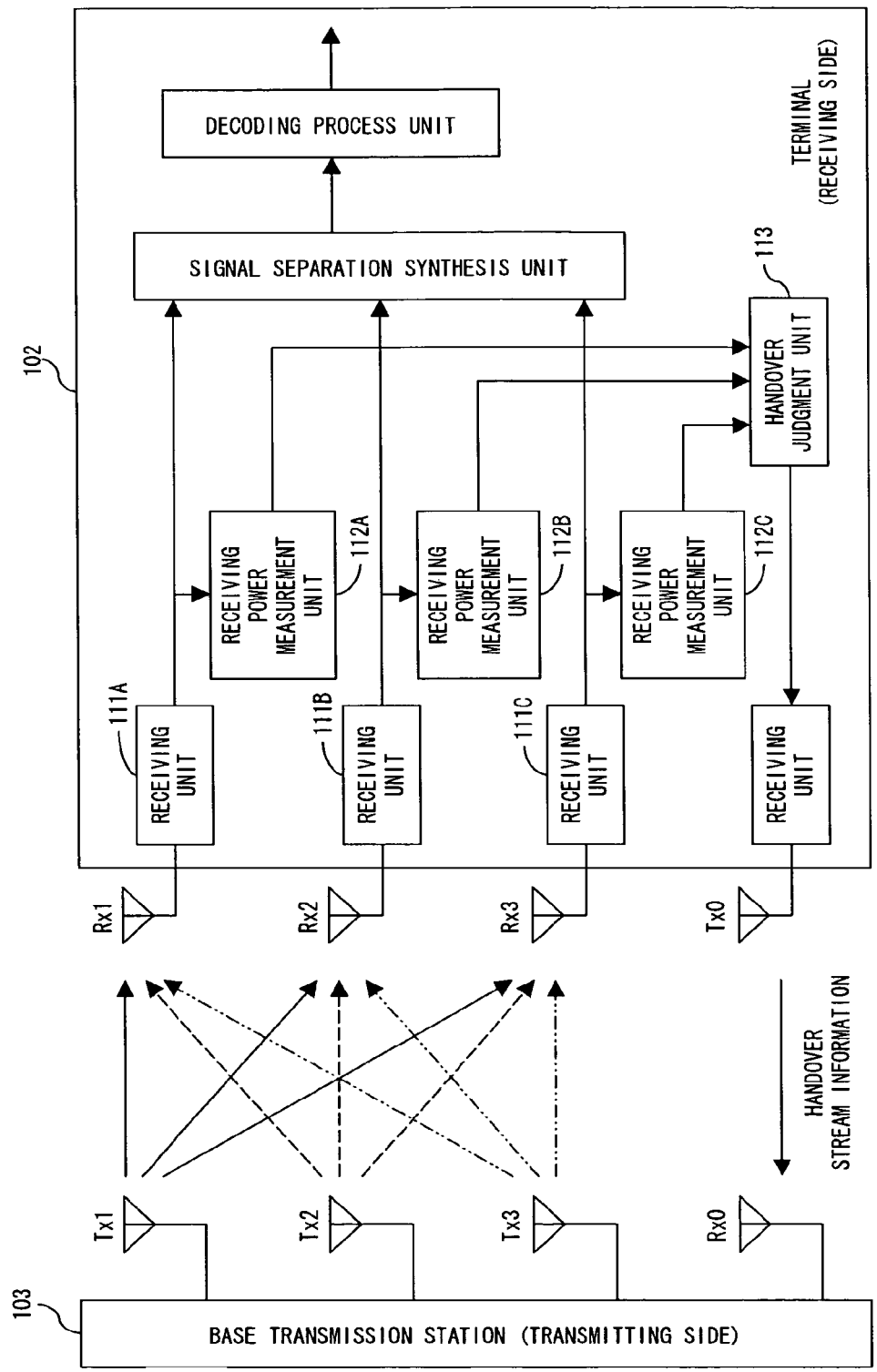
FIG. 3 exemplifies a comprisal of a mobile station according to the conventional technique.
Figure 4A:
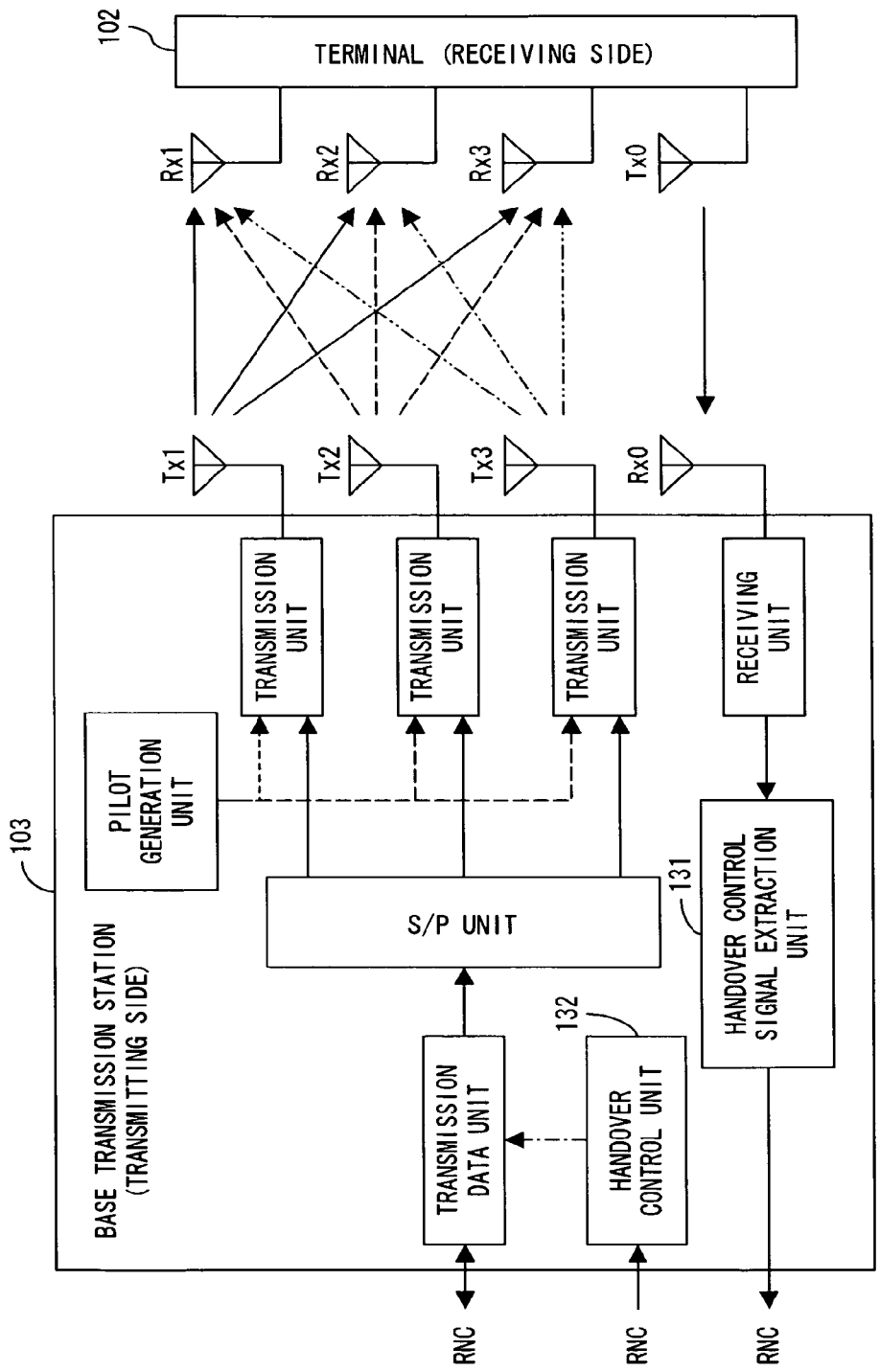
FIG. 4A exemplifies a comprisal of a base transmission station according to the conventional technique.
Figure 4B:
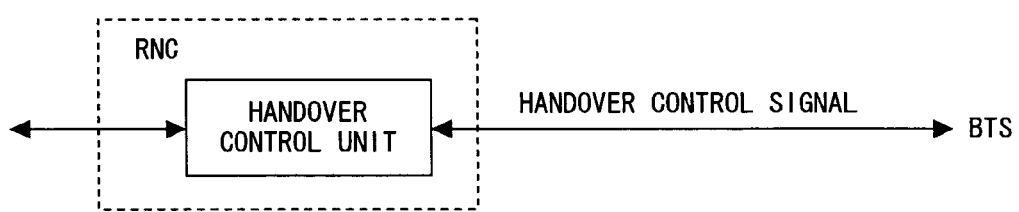
FIG. 4B exemplifies a comprisal of a radio network controller according to the conventional technique.
Figure 5:
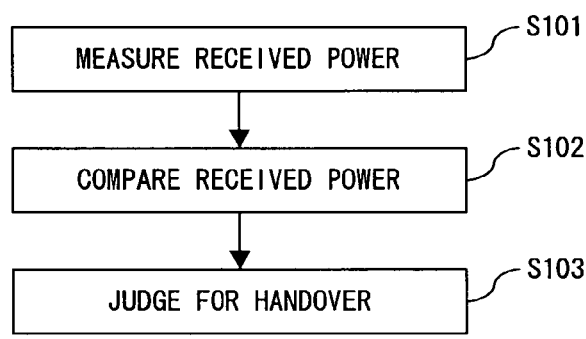
FIG. 5 shows a process procedure of a handover in a conventional system.
Figure 6:
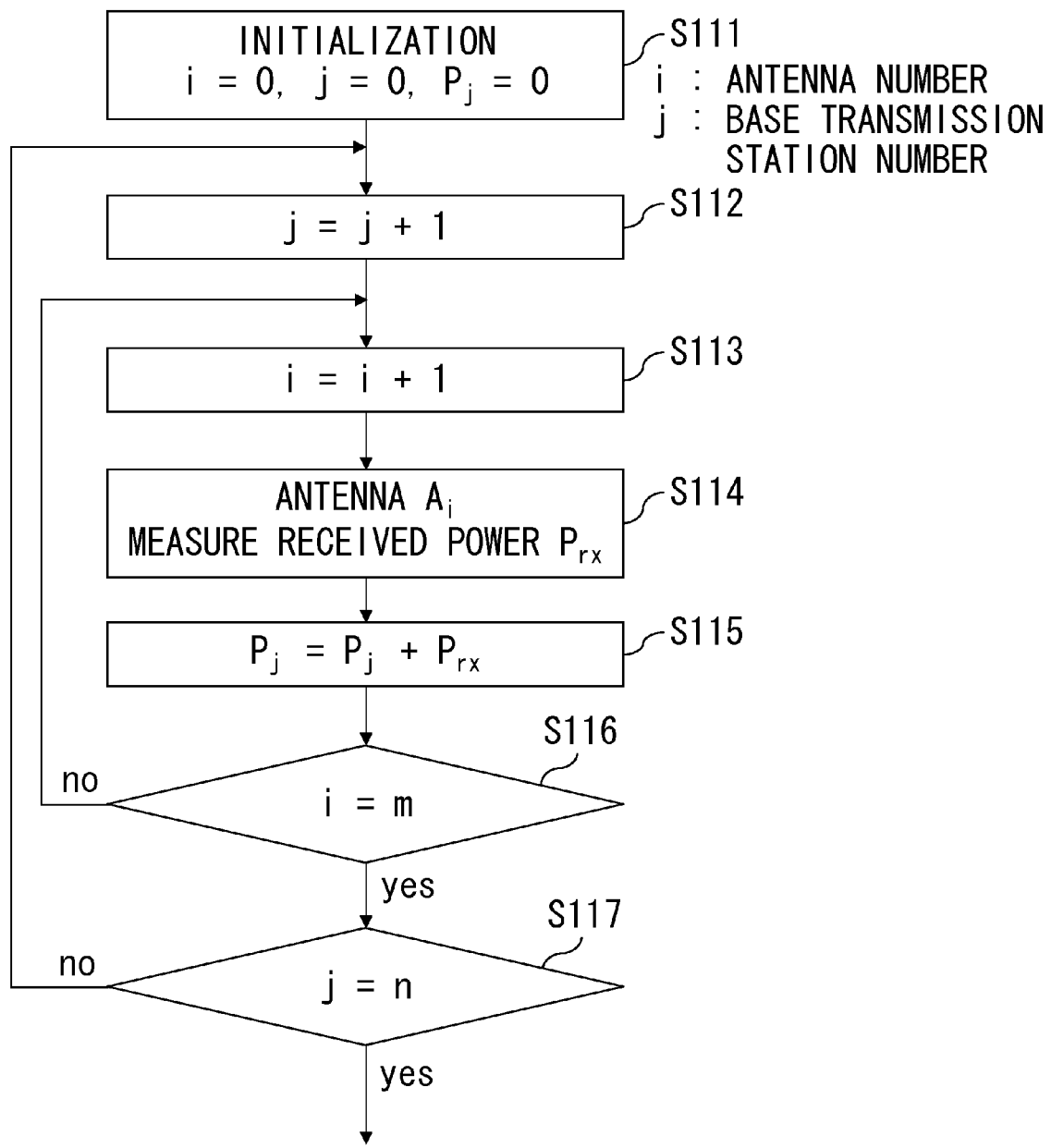
FIG. 6 is a flow chart showing a definite measurement processing of a received power as a part of the conventional handover processing.
Figure 7:
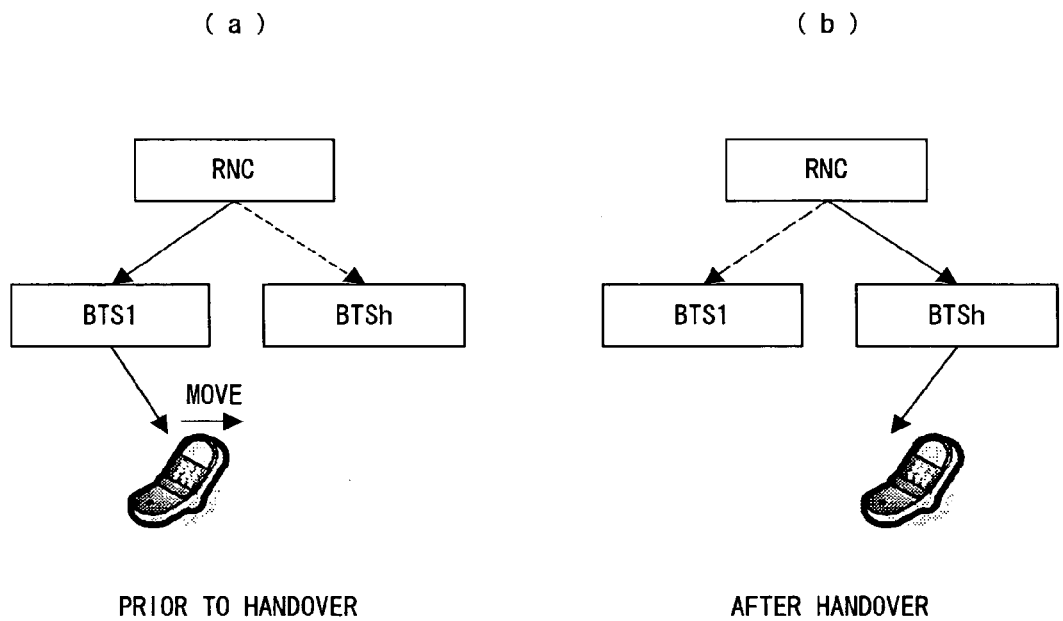
FIG. 7 illustrates data transmission pre- and post-handover according to the conventional technique.
Figure 8:
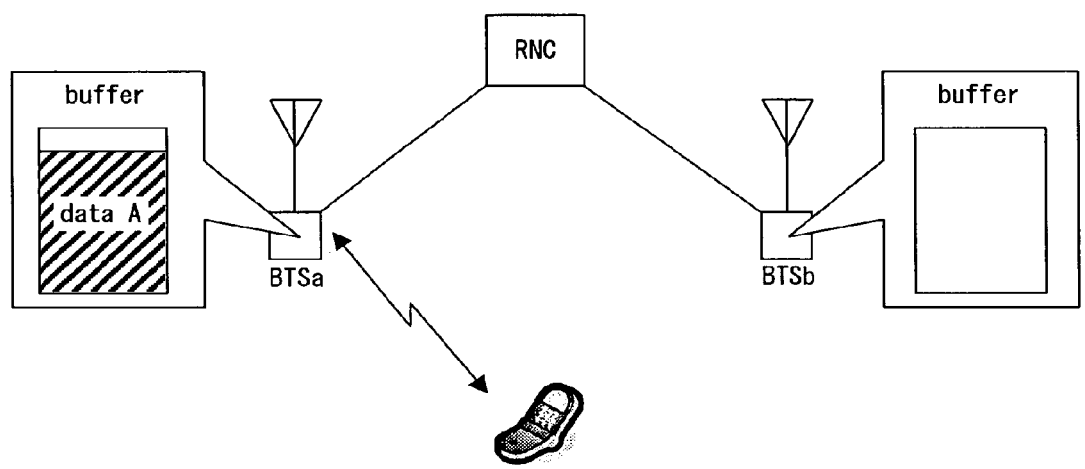
FIG. 8 describes a state of a buffer at each base transmission station prior to a handover.
Figure 9:
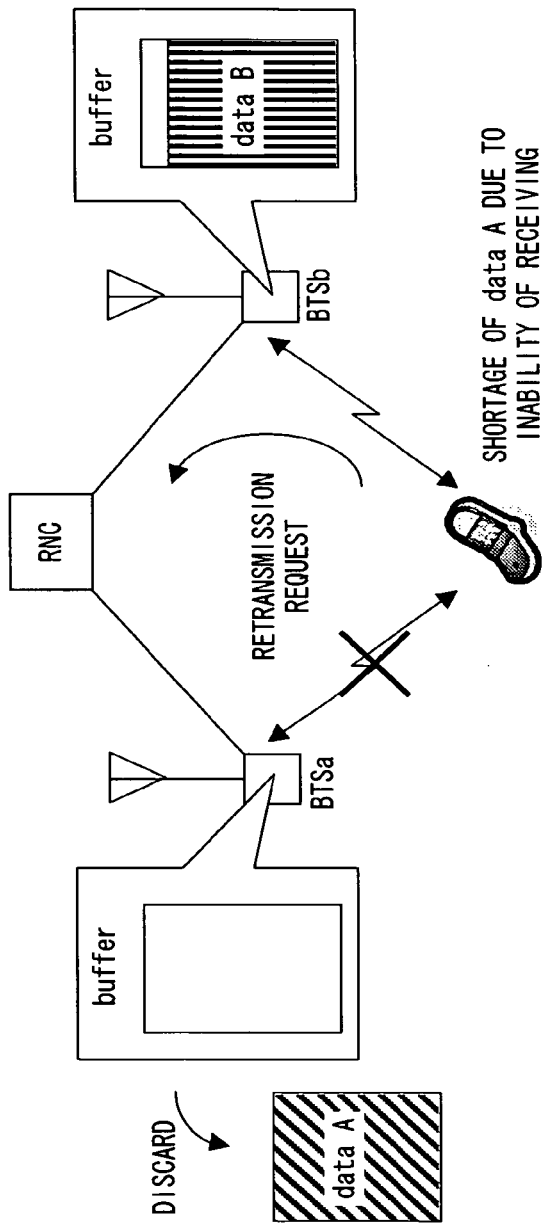
FIG. 9 describes a state of the buffer at each base transmission station immediately after carrying out a handover in the case of retransmitting data after the handover.
Figure 11:
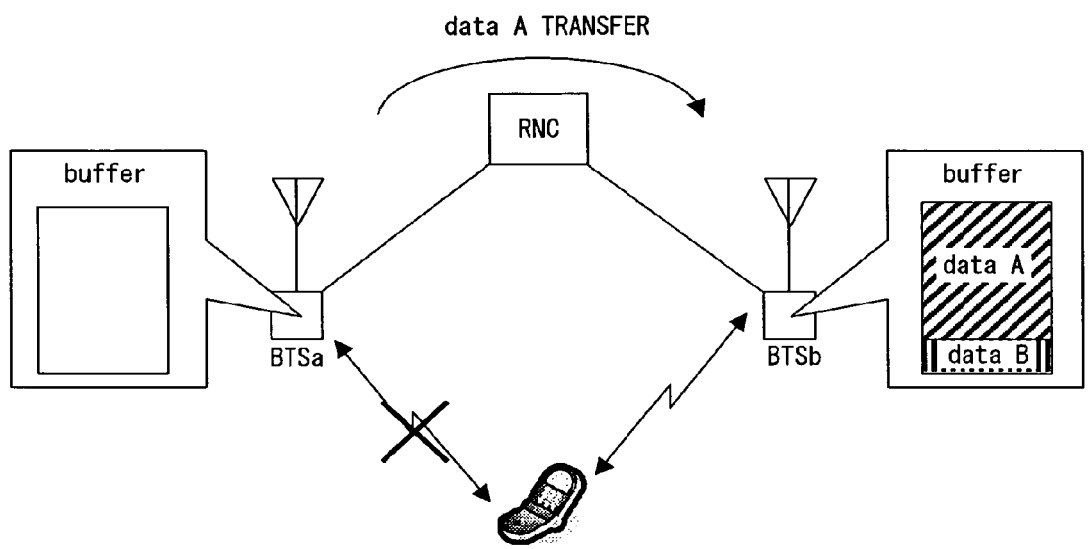
FIG. 11 describes a state of a buffer at each base transmission station immediately after carrying out a handover in the case of transferring data after the handover.

The following is a detailed description of the preferred embodiment of the present invention referring to the drawings.

First Embodiment

FIG. 12 is a conceptual diagram of a handover method according to the present invention. A wireless telecommunication system 1 using a MIMO transmission technique which adopts HSDPA (high speed downlink packet access) as one standard specification of W-CDMA comprises base transmission stations BTS 3 ($BTS_{3a}$ and $BTS_{3b}$) and a mobile station (MS) 2. As shown by FIG. 12 (a), the mobile station 2 receives a plurality of data streams via the base transmission station $BTS_{3a}$ prior to a handover. With regard to a received power for the same data stream, if a received power from another base transmission station, which the own mobile station 2 is not connected to, is larger than that from the connected base transmission station, a handover is carried out for the aforementioned data stream. As shown by FIG. 12 (b), a data stream after the handover being carried out is transmitted to the mobile station 2 via a base transmission station $BTS_{3b}$. The data streams for which a handover is not carried out are transmitted to the mobile station 2 via the base transmission station $BTS_{3a}$ as before. That is, the mobile station 2 receives one or more data streams from the base transmission station $BTS_{3a}$ and at the same time receives one or more data streams from the base transmission station $BTS_{3b}$.

Figure 13:
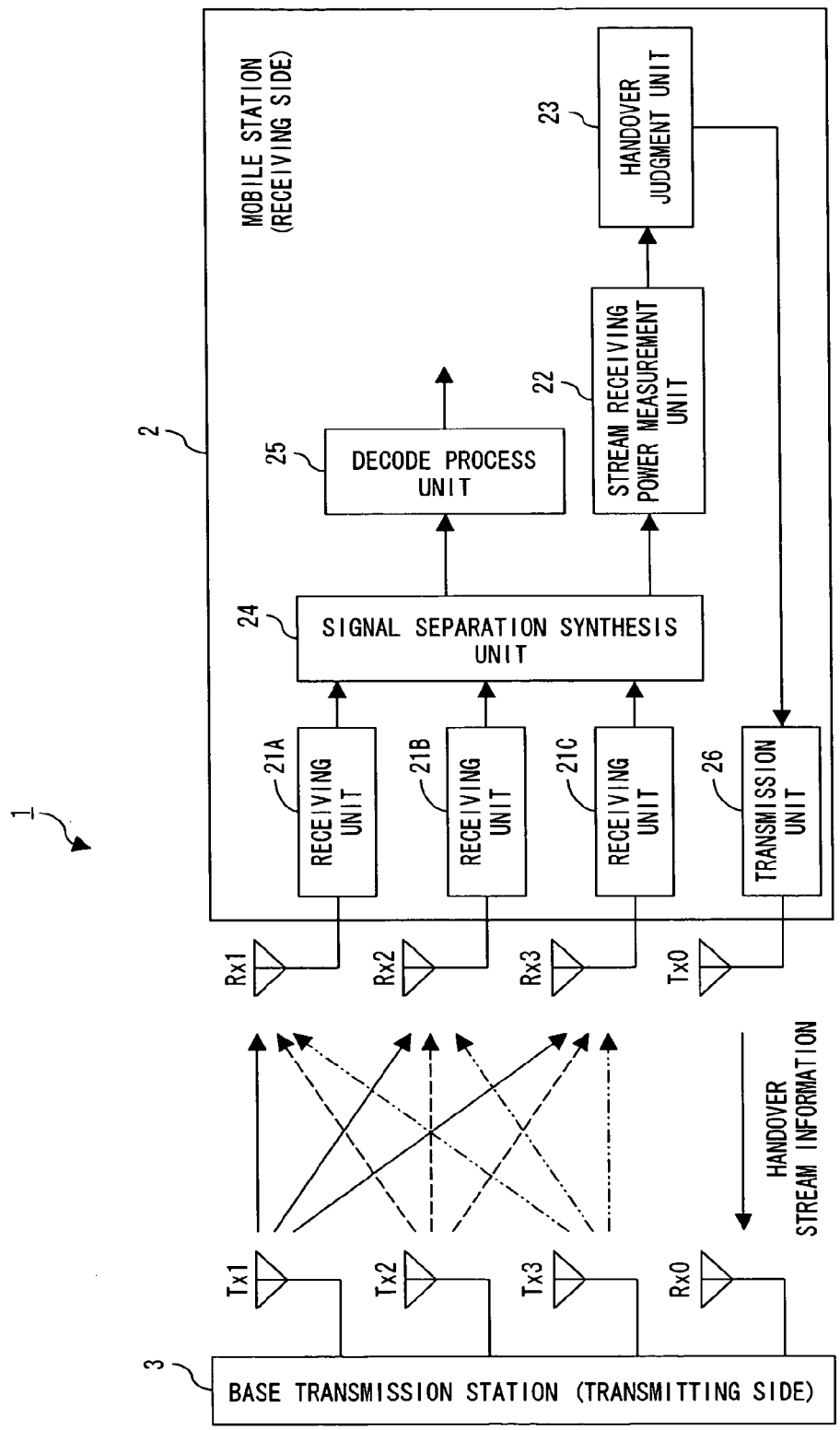
FIG. 13 shows a comprisal of a mobile station carrying out a handover according to a first embodiment.

FIG. 13 shows a comprisal of a mobile station 2 carrying out a handover according to the first embodiment. In the example shown by FIG. 13, a comprisal of a three by three (3×3) antennas is shown as an example of a wireless telecommunication system of m by n (m×n) antennas (where m and n are integer).

The mobile station 2 shown by FIG. 13 includes a plurality of antennas Rx ($Rx_1$, $Rx_2$ and $Rx_3$), a plurality of receiver units 21 (21A, 21B and 21C), a signal separation synthesis unit 24, a decode process unit 25, a stream received power measurement unit 22, a handover judgment unit 23 and a transmission unit 26.

The plurality of receiver units 21 are interfaces for processing signals received by way of the respective antennas Rx. The signal separation synthesis unit 24 reproduces a plurality of data streams from signals received from the base transmission station 3 by way of the receiving units 21 to provide them to the decode process unit 25 and the stream received power measurement unit 22. In this event, only a pilot signal may be transmitted to the stream received power measurement unit 22. The decode process unit 25 decodes the reproduced data streams. The stream received power measurement unit 22 measures a received power of the each stream (i.e., a pilot signal specifically) reproduced by the signal separation synthesis unit 24. In this event, the stream received power measurement unit 22 measures a received power of the each stream received from the currently connected base transmission station and that of each stream from other base transmission stations positioned in the surrounding area of the mobile station 2. The handover judgment unit 23 judges a necessity of a handover based on the measurement result of the stream received power measurement unit 22. The transmission unit 26 is an interface for transmitting a message such as a handover request by way of the antenna $Tx_0$ in the present embodiment.

In the conventional wireless telecommunication system, a sum of the received power of a plurality of streams (that is, the total received power) is measured for each base transmission station, and a necessity of a handover has been judged according to the total received power as described by referring to FIGS. 2A through 6. Comparably, in the wireless telecommunication system 1 according to the present embodiment, the received power is measured for each stream and a necessity of a handover is judged according to the result.

Figure 14:
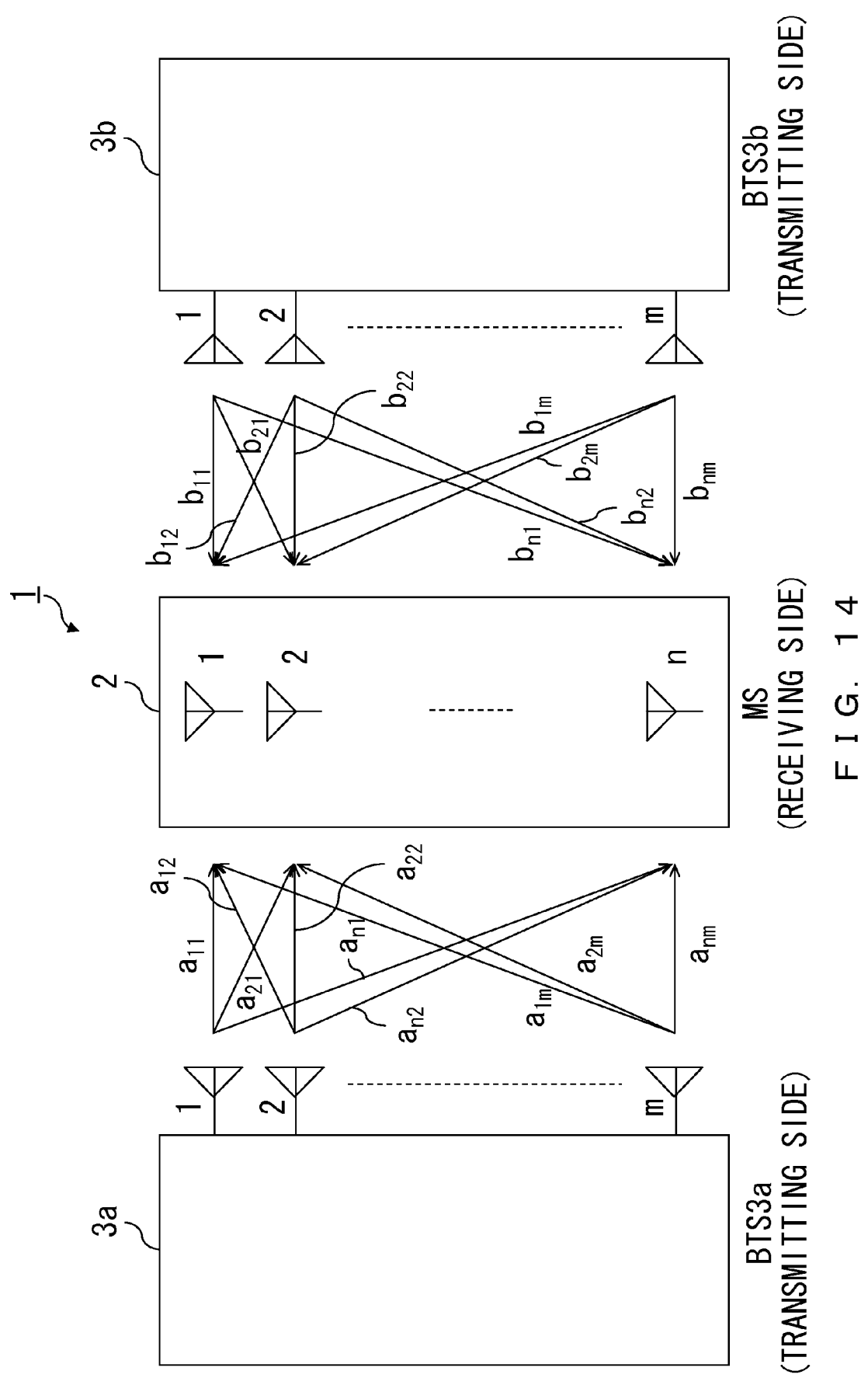
FIG. 14 illustrates a transmission and reception of a data stream according to the first embodiment.

FIG. 14 illustrates a transmission and reception of a data stream according to the present embodiment. Under the control of the wireless telecommunication system 1, the mobile station 2 receives a data stream from a plurality of base transmission stations 3, that is, from two base transmission stations $BTS_{3a}$ and $BTS_{3b}$ in the system comprisal shown by FIG. 13. In an m by n (m×n) wireless telecommunication system, the base transmission station 3, i.e., the transmitter side apparatus for data, divides data to be transmitted and transmits a data stream by way of the m-number of antennas. The mobile station 2, i.e., the receiving side apparatus for data, comprises the n-number of antennas and receives the data stream by way thereof. A channel response matrix used for separating a received signal received from the base transmission station $BTS_{3a}$ at the mobile station 2 into each data stream is as follows:

$$H = \begin{bmatrix} a_{11} & a_{12} & \cdots & a_{1m} \\ a_{21} & a_{22} & \cdots & a_{2m} \\ \vdots & \vdots & \ddots & \vdots \\ a_{n1} & a_{n2} & \cdots & a_{mn} \end{bmatrix} \quad (1)$$

The signal separation synthesis unit 24 separates, by using the matrix shown by the expression (1) the data stream received via the base transmission station $BTS_{3a}$. The separated signal is provided to the decode process unit 25 to obtain a decoded signal.

Note here that the mobile station 2 is configured to determine a channel response matrix between the base transmission station $BTS_{3a}$ and mobile station 2 in advance by utilizing a pilot signal transmitted from the base transmission station $BTS_{3a}$. And that the mobile station 2 is also configured to determine a channel response matrix between a base transmission station in the surrounding area (i.e., $BTS_{3b}$ herein) and mobile station 2 by using a pilot signal transmitted from the base transmission station $BTS_{3b}$. The channel response matrix between the base transmission station $BTS_{3b}$ and mobile station 2 is shown by the expression (2):

$$H = \begin{bmatrix} b_{11} & b_{12} & \cdots & b_{1m} \\ b_{21} & b_{22} & \cdots & b_{2m} \\ \vdots & \vdots & \ddots & \vdots \\ b_{n1} & b_{n2} & \cdots & b_{nm} \end{bmatrix} \quad (2)$$

Here, the assumption is that a received power of the stream transmitted from an antenna $A_2$ of the base transmission station $BTS_{3a}$ is exceeded by that of the stream transmitted from an antenna 2 of the base transmission station $BTS_{3b}$, resulting in the carrying out of a handover according to the present invention as shown by FIG. 12. In this case, the channel response matrix used for separating into each stream, a signal received from the base transmission stations $BTS_{3a}$ and $BTS_{3b}$ at the mobile station 2 is expressed by:

$$H = \begin{bmatrix} a_{11} & a_{12} & \cdots & a_{1m} \\ b_{21} & b_{22} & \cdots & b_{2m} \\ \vdots & \vdots & \ddots & \vdots \\ a_{n1} & a_{n2} & \cdots & a_{nm} \end{bmatrix} \quad (3)$$

In the above expression (3), the matrix elements $b_{21}$, $b_{22}$ through $b_{2m}$ in the second column express a propagation characteristic between the second antenna of the base transmission station $BTS_{3b}$ and mobile station 2.

Thus, replacement of the element, with that of the channel response matrix of a target base transmission station, of the channel response matrix relating to a data stream to be changed over carries out a handover for each data stream according to the present invention.

Figure 15:
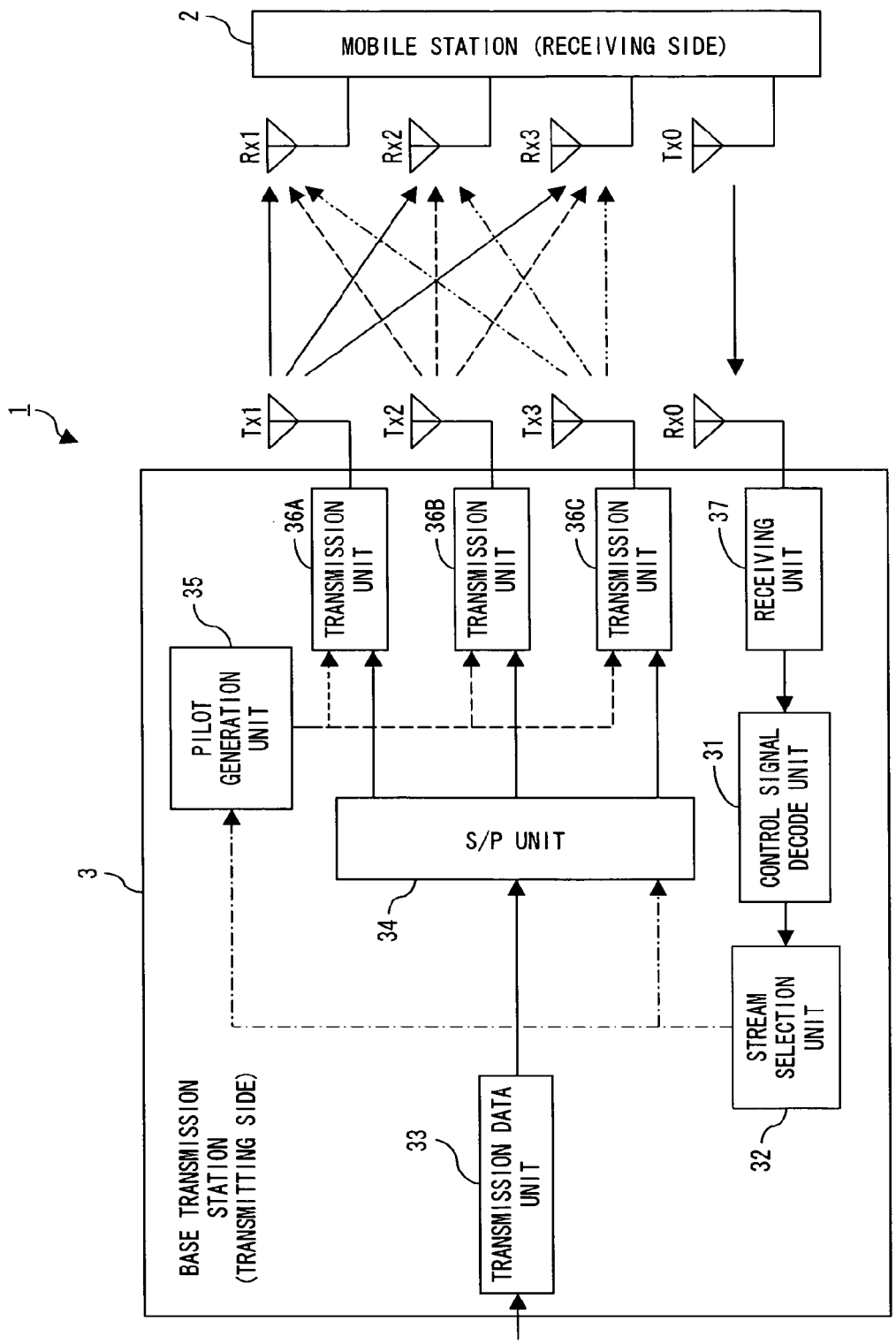
FIG. 15 shows a comprisal of a base transmission station carrying out a handover method according to the first embodiment.

FIG. 15 shows a comprisal of a base transmission station 3 carrying out a handover method according to the first embodiment, showing a configuration of three by three (3×3) antennas as in the case of FIG. 13.

The base transmission station 3 shown by FIG. 15 comprises a transmission data unit 33, an S/P unit 34, a pilot generation unit 35, a plurality of transmission units 36 (i.e., 36A, 36B and 36C), a plurality of antennas Tx (i.e., $Tx_1$, $Tx_2$ and $Tx_3$), a receiving unit 37, a control signal decode unit 31 and a stream selection unit 32.

The transmission data unit 33 includes a memory for accumulating data to be transmitted to the mobile station 2, which is received from an upper level control station (i.e., the RNC in the HSDPA system). The S/P unit 34 parallelizes a serial signal received from the upper level control station to provide it to each of the transmission units 36. The pilot generation unit 35 generates a pilot signal corresponding to each stream. The plurality of transmission units 36, i.e., 36A, 36B and 36C in the example of FIG. 15, are interfaces for transmitting pilot signals and data by way of the antennas $Tx_1$, $Tx_2$ and $Tx_3$, respectively. The receiving unit 37 is an interface for receiving a handover request from the mobile station 2, et cetera, shown by FIG. 13 by way of the antenna $Rx_0$. The control signal decode unit 31 decodes a control signal given by the receiving unit 37. The stream selection unit 32 selects a data stream to be changed over based on the decoded control signal and controls the S/P unit 34 and the pilot generation unit 35.

Let it be defined for the following description that the base transmission station currently connected to the mobile station 2 is the $BTS_{3a}$ and those base transmission stations positioned in the surrounding area of the mobile station 2, other than the $BTS_{3a}$, are $BTS_{3b}$, $BTS_{3c}$ through $BTS_{3n}$. The stream received power measurement unit 22 comprised by the mobile station 2 measures the received power $P_{bts3a}$, $P_{bts3b}$ through $P_{bts3n}$ of the respective data streams transmitted from the base transmission station 3. The handover judgment unit 23 compares the values of the received power $P_{bts3a}$, $P_{bts3b}$ through $P_{bts3n}$ for each data stream, thereby judging a necessity of a handover. Note that a received power to be measured is defined as a received power which is measured based on a pilot signal.

Figure 16:
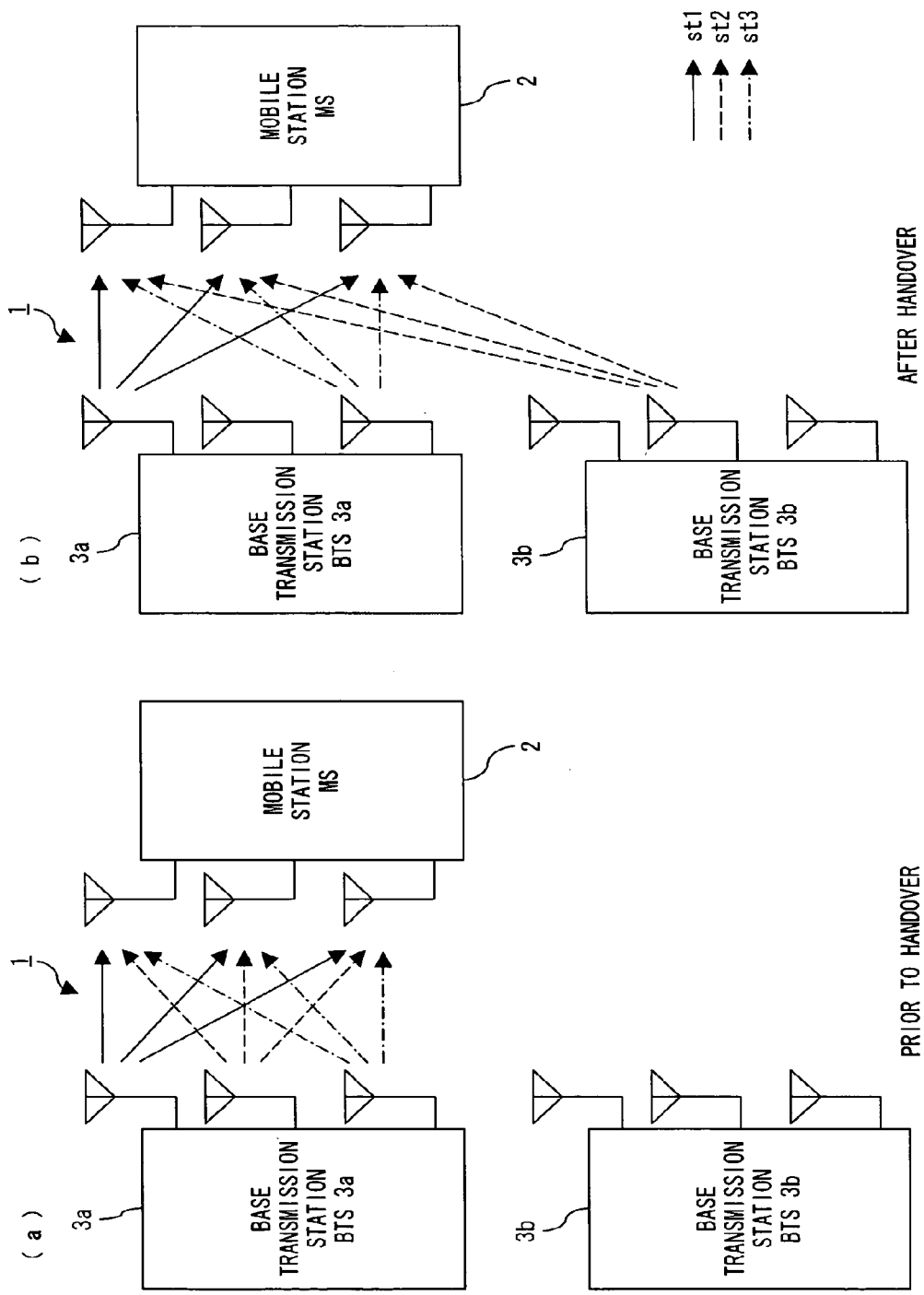
FIG. 16 illustrates a handover method according to the first embodiment.

FIG. 16 illustrates a handover method according to the first embodiment. As shown by FIG. 16 (a), all of three data streams, i.e., $st_1$, $st_2$ and $st_3$, are transmitted from the $BTS_{3a}$ to the mobile station 2 prior to a handover. Among the three data streams, if the received power from the $BTS_{3a}$ is exceeded by that from the $BTS_{3b}$ for the data stream $st_2$, resulting in a judgment for carrying out a handover to the $BTS_{3b}$ therefor, then the path for the data stream $st_2$ is changed over. As shown by FIG. 16 (b), the remaining two data streams, i.e., $st_1$ and $st_3$, are maintained for transmission from the $BTS_{3a}$ to the mobile station 2.

Figure 17:
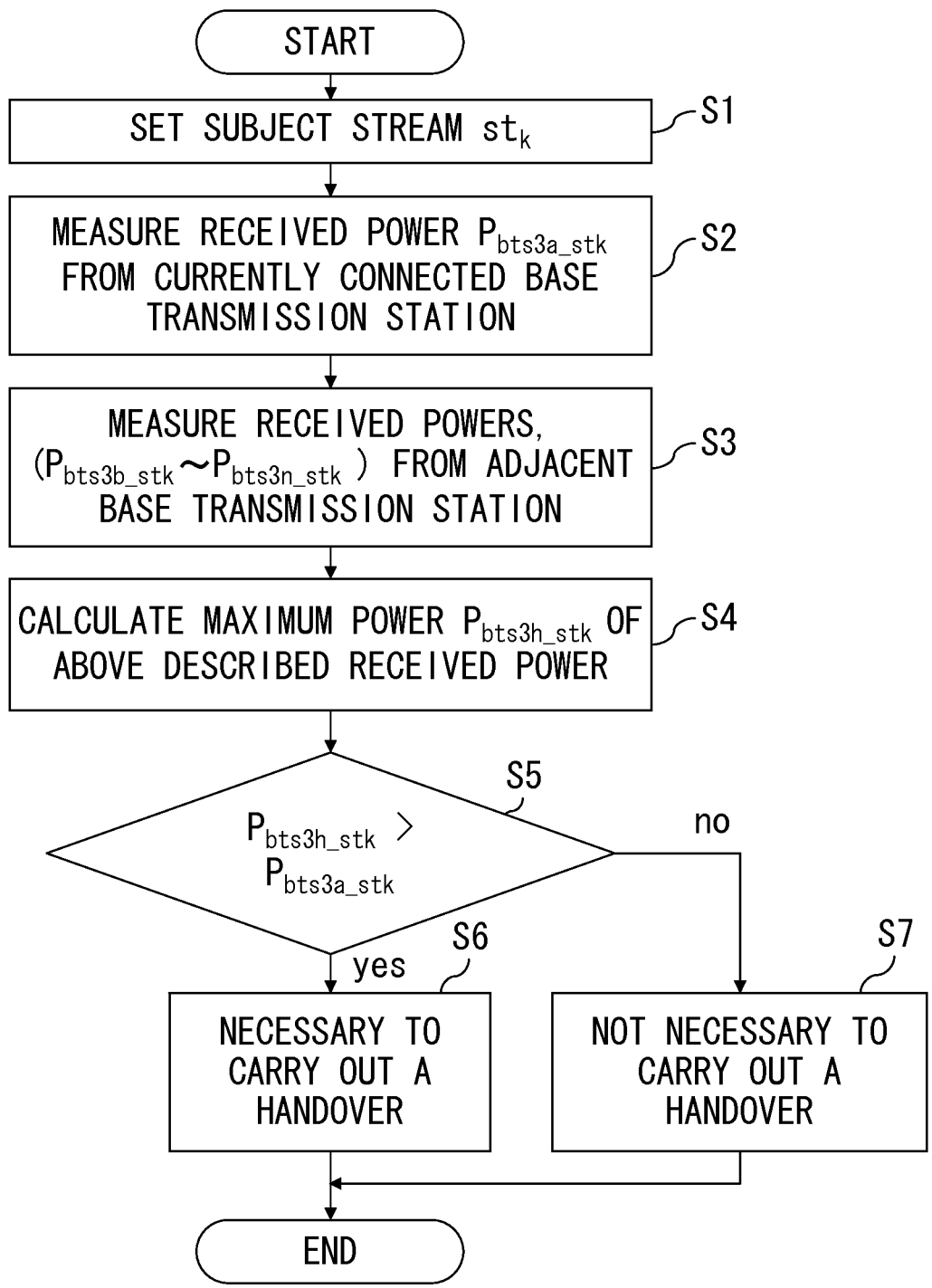
FIG. 17 is a flow chart of the processing of judging a necessity of handover.

FIG. 17 is a flow chart of the processing for judging a necessity of handover. The processing shown by FIG. 17 is carried out only at the time when the mobile station 2 configured as shown by FIG. 13 receives a pilot signal transmitted from the base transmission station 3 at a predetermined time interval.

First, the step S1 sets a data stream $st_k$ as the subject of judging a necessity of a handover, setting any one of the data streams $st_1$, $st_2$ or $st_3$ in this step according to the present embodiment. The step S2 measures the received power $P_{bts3a\_stk}$ of a data stream $st_k$ received from the currently connected base transmission station $BTS_{3a}$. The step S3 measures the received powers $P_{bts3b\_stk}$, $P_{bts3c\_stk}$ through $P_{bts3n\_stk}$ of the data stream $st_k$ relating to the nearby base transmission stations $BTS_{3b}$, $BTS_{3c}$ through $BTS_{3n}$. The step S4 calculates the maximum received power $P_{bts3h\_stk}$ from among the received power of the data stream $st_k$ calculated in the step S3.

The step S5 compares the $P_{bts3a\_stk}$ from the currently connected base transmission station $BTS_{3a}$ with the maximum received power $P_{bts3h\_stk}$ calculated in the step S4. If the maximum received power $P_{bts3h\_stk}$ is larger than the received power $P_{bts3a\_stk}$, the step S6 judges that there is a necessity of carrying out a handover, thus ending the processing. Conversely, if the maximum received power $P_{bts3h\_stk}$ is at the $P_{bts3a\_stk}$ or less, then the step S7 judges that there is no necessity of carrying out a handover, thus ending the processing. As for a data stream $st_k$ for which the processing of the step S5 judges that there is a necessity of a handover, then it is carried out so as to transmit to the mobile station 2 via the base transmission station $BTS_{3h}$ with the maximum received power.

The processing shown by FIG. 17 is carried out for each of all the simultaneously transmitted data streams, that is, each of the three data streams $st_1$, $st_2$ and $st_3$ according to the present embodiment, and thereby the optimal base transmission station (i.e., being defined as $BTS_{3i}$) is determined for transmitting each data stream. Once it is decided to carry out a handover for a certain data stream, a handover control unit for controlling a handover at the RNC, et cetera, determines a target base transmission station $BTS_{3i}$, transmits the data transmitted from an upper level station thereto and stops transmitting the data to the current base transmission station $BTS_{3a}$.

Note that the present embodiment comprises the handover judgment unit 23 in the mobile station 2 as shown by FIG. 13, but that the mobile station 2 is not the only unit capable of judging a necessity of a handover. The RNC or the base transmission station 3 may judge it based on a measurement result of a received power for each data stream in the mobile station 2. The following describes cases exemplifying the RNC and the mobile station 2 judging a necessity of a handover to describe the control processes for both cases in detail.

Figure 18:
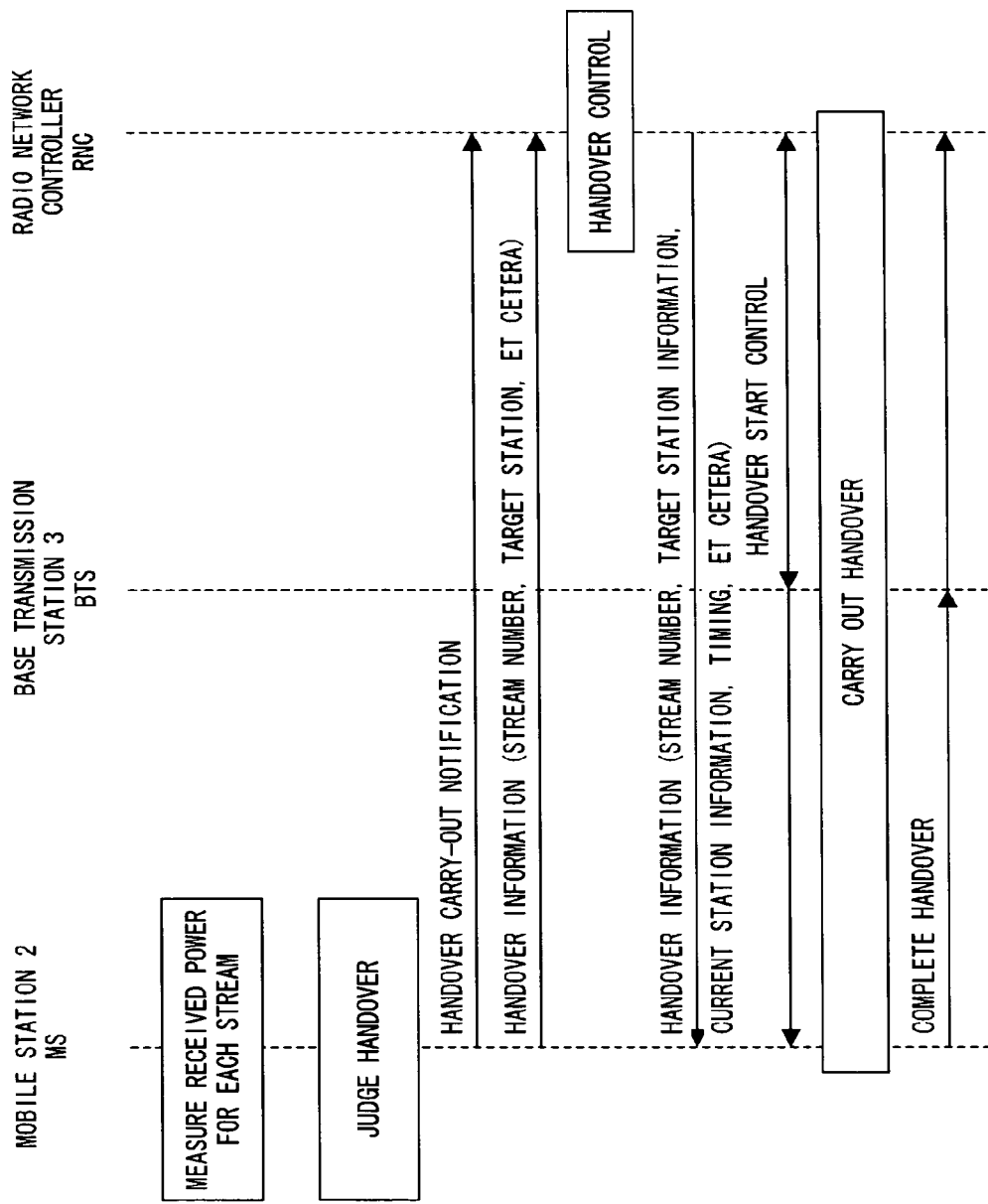
FIG. 18 is a control sequence chart (part 1) of a handover judgment processing.

FIG. 18 is a control sequence chart of a handover judgment processing in the case of the mobile station 2 judging a necessity of a handover. The processing shown by FIG. 18 is only carried out at the time when the mobile station 2 receives a pilot signal, transmitted from the base transmission station at a predetermined time interval.

First in the mobile station 2, a received power is measured for each data stream. The measured received power for each data stream is compared for judging a necessity of a handover. The measurement of a received power for each data stream and the judgment for a necessity of a handover based on the result of the measurement are the same as was described in reference to FIG. 17. Here, if the judgment is to carry out a handover, the mobile station 2 transmits a handover carry-out notification message to the RNC, followed by transmitting handover information to the RNC. Here, the handover information is information about a stream number, a target base transmission station, et cetera, for example, indicating which data stream is to be changed over to which base transmission station.

Having received the handover carry-out notification and the handover information, the RNC transmits the handover information to the mobile station 2. Here, the handover information transmitted from the RNC to the mobile station 2 includes a stream number, target base transmission station information, current base transmission station information, handover timing information, et cetera, for example. Furthermore, the RNC determines and controls a trigger for carrying out a handover. The RNC notifies the target base transmission station $BTS_{3i}$, current base transmission station $BTS_{3a}$ and mobile station 2 of the handover timing determined by the RNC. The handover is carried out according to the handover timing notification from the RNC.

A handover start control processing is performed between the RNC and the base transmission station, and the path of the data stream is changed over. In the handover processing, messages such as "line setup", "line connection", "line disconnection", et cetera, are transmitted as notifications to the target base transmission station $BTS_{3i}$ and the current base transmission station $BTS_{3a}$. When completing the handover, the mobile station 2 transmits a handover complete control message to the target base transmission station, and the base transmission station, having received the message, transmits a handover complete control message and ends the processing.

The handover information transmitted from the RNC to the mobile station 2 in the sequence shown by FIG. 18 enables each telecommunication apparatus to recognize information about a data stream or a base transmission station to carry out a handover. The following description is of information transmitted from the RNC to a base transmission station 3 and mobile station 2 which are under the RNC referring to FIG. 19, and FIGS. 20A through 20D.

FIG. 19 exemplifies a data structure of handover information transmitted as a notification by the RNC to a lower level apparatus; and FIG. 20A through 20D is a definite example of handover information. The handover information shown by FIG. 19 includes handover (HO) carry-out information for each data stream, target base transmission station information, current base transmission station information and handover timing information (i.e., handover carry-out time information).

The handover (HO) carry-out information for example indicates a data stream to be changed over among a plurality of simultaneously transmitted data streams, or a necessity of a changeover for each data stream. FIG. 20A is an actual example of handover carry-out information, storing data indicating a necessity of carrying out a handover for each of a plurality of data streams, i.e., six data streams herein.

According to the "example 1" of FIG. 20A, the data streams to be changed over are the stream numbers "1", "3", "5" and "6" among the six data streams. According to "example 2" of FIG. 20A, the data stream to be changed over is "3" only. This information can be coded by "1" for data streams to be changed over and "0" for those not to be changed over as exemplified by FIG. 20A, and stored in a predetermined area of FIG. 19 as handover carry-out information. Alternatively, a stream number of a data stream to be changed over may be stored in a predetermined area of FIG. 19 as handover information for example.

The target station information indicates a base transmission station 3 which becomes the connecting station for the mobile station 2 after carrying out a handover. FIG. 20B is an actual example of target station information. The "example 1" of FIG. 20B shows that the stream numbers 1, 3, 5 and 6 are changed to the base transmission stations with the station numbers "120", "121", "120" and "121", respectively. Incidentally, the example 1 shows that the stream numbers 2 and 4 store zero ("0") as the station numbers, indicating that no handover will be carried out. Likewise for the example 2, the data stream with the stream number 3 is changed over to the base transmission station 3 with the base transmission station number "23" while other data streams store zero ("0"), hence carrying out no handover.

The current station information indicates the base transmission station 3 to which the mobile station 2 is connected prior to carrying out a handover. FIG. 20C is an actual example of current station information. As shown by FIG. 20C, if a number other than zero ("0") is stored as the number for a current base transmission station corresponding to a stream number, the base transmission station number of the base transmission station to which the mobile station 2 is connected prior to carrying out a handover is indicated. If zero ("0") is stored, it indicates that a handover is not carried out for the data stream of the corresponding stream number. In the example 1, the data shown by FIG. 20C indicate that all four data streams for which a handover processing are about to be carried out are connected to the base transmission station with the base transmission station number "1". Likewise in the example 2, the data shown by FIG. 20C indicate that the number 3 data stream for which a handover is about to be carried out is connected to the base transmission station with the base transmission station number "1".

The handover timing information stores an absolute time, a relative time or a value in the unit of frames. FIG. 20D is an actual example of handover timing information. The handover timing information shown by FIG. 20D indicates how many frames after a notification of handover information the handover is to be started. A value of zero ("0") stored for the data stream indicates that no handover is to be carried out. In the example 1 of FIG. 20D, handover is started at 20, 20, 18 and 22 frames, respectively, for the data streams with the numbers 1, 3, 5 and 6, respectively which are changed over by handovers. Likewise in the example 2, a handover is started at ten frames for the number 3 data stream.

Note that the handover carry-out information is not limited to the above described structure shown by FIG. 19, but can be achieved by any structure compiling the above described various pieces of information for each data stream for example. Or handover carry-out information relating only to a data stream for which a handover is to be carried out may be indicated, while information relating to a data stream for which a handover is not to be carried out may be omitted.

After paths are changed over for a predetermined data stream based on the handover carry-out information, the buffer of the base transmission station (i.e., $BTS_{3a}$ in the above described example), that is, the transmission data unit 33 shown by FIG. 15 is left with un-transmitted data of the changed over data stream $st_k$. According to the handover method according to the present embodiment, the un-transmitted data is transmitted by another data stream. That is, handovers are not carried out for all the data streams at once in the handover method according to the present embodiment, by using a data stream for which a handover is not carried out it is possible to transmit data until the data accumulated in the transmission data unit 33 at the current base transmission station $BTS_{3a}$ is transmitted.

FIG. 21 is a flow chart of transmission processing for accumulated data in a current base transmission station. The processing shown by FIG. 21 is carried out if the step S6 of the process of judging a necessity of a handover shown by FIG. 17 judges that "there is a necessity of carrying out a handover".

First, as the processing is started, the step S11 judges whether or not a handover is judged to be necessary for each data stream, and the step S12 calculates the number of data streams (i.e., ST_rest) for which no handover has been judged to be necessary. The step S13 judges whether or not there is a data stream (i.e., ST_rest>0) for which a data transmission continues from the current base transmission station after carrying out a handover.

If there is no continuation of a data transmission from the current base transmission station after carrying out a handover, that is, if a handover is carried out for all the data streams, the step proceeds to S14 to perform a handover for each data stream. The accumulated data are transmitted to the mobile station 2 while the handovers are carried out for data streams sequentially one after another. Note that the processing of the step S14 may be executed after all the accumulated data in the base transmission station have been transmitted.

If a data transmission continues from the current base transmission station after carrying out a handover, that is, a data stream for which a handover is not carried out exists, the processing proceeds to the step S15 and calculates a data amount (i.e., Mdata) accumulated in the transmission data unit 33 of the base transmission station. The step S16 judges whether or not an accumulated data amount exists (i.e., is Mdata>0?).

If an accumulated data does not exist in the base transmission station, the process proceeds to the step S17 to carry out a handover for the rest of the data streams. If an accumulated data exists, the process proceeds to the step S18 to transmit until the accumulated data in the current base transmission station $BTS_{3a}$ is completely transmitted by using a data stream for which a handover is not carried out.

Incidentally relating to a sequence of handover in the step S14, for example, carrying out a handover in order of data stream received power from the connecting base transmission station, being of relatively low power, allows a data transmission to be performed securely, thereby making it possible to prevent the overall transmission speed from decreasing.

Figure 22:
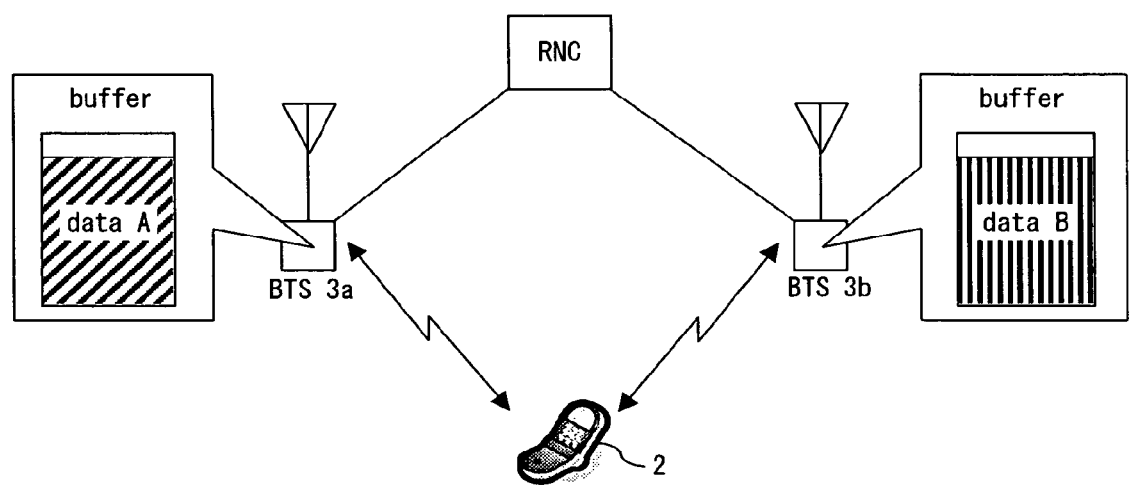
FIG. 22 illustrates a state of accumulated data at the base transmission station after carrying out a handover.

FIG. 22 illustrates a state of accumulated data at the base transmission station after carrying out a handover according to the present embodiment. Data (i.e., data A), which has been transmitted from the RNC to the base transmission station $BTS_{3a}$ prior to carrying out the handover and is yet to be transmitted to the mobile station 2, is still accumulated in the buffer of the base transmission station $BTS_{3a}$ at the time of carrying out the handover. The handover method according to the present embodiment makes it possible to transmit the un-transmitted data A to the mobile station 2 by using an antenna with which a handover has not been carried out of the base transmission station $BTS_{3a}$ by the processing shown by FIG. 21, even if the path for a data stream is changed over to being via the base transmission station $BTS_{3b}$. Incidentally, the data B, which is transmitted from the RNC to the base transmission station $BTS_{3b}$ at the time of changing over the path as a result of the handover, is transmitted from the base transmission station $BTS_{3b}$ to the mobile station 2.

When the data accumulated in the transmission data unit 33 of the base transmission station $BTS_{3a}$ is all transmitted to the mobile station 2, the RNC cancels the connection with the base transmission station $BTS_{3a}$. Likewise in the target base transmission station $BTS_{3i}$, a handover is carried out based on the received power for each data stream according to the present embodiment.

The above described handover method is configured so that the RNC notifies all the target base transmission station $BTS_{3i}$, current base transmission station $BTS_{3a}$ and mobile station 2 of the handover carry-out information as shown by FIG. 19, but is not limited as such. Meanwhile, the above described number of data streams, the base transmission station number, et cetera, for which a handover is carried out, are only examples and there is no intention to set an upper limit, et cetera. For example, a handover may be carried out for a target base transmission station selected for each of every data stream or for a specific data stream. Alternatively, a priority may be assigned according to a telecommunication environment for example, such as carrying out a handover first for a specific data stream. The same consideration also applies to the below described embodiments.

As for the sequence of data streams for which handover is to be carried out, it is possible to carry out all at once for all the data streams which are judged as the subject of handovers, or for each data stream sequentially one by one. In the case of carrying out a handover per data stream, it is possible to compare a received power from each target base transmission station for each data stream and carry out a handover in a sequence of the data stream with the lowest received power first, which makes it possible to transmit each data stream securely. Alternatively, it is possible to carry out a handover in a sequence of the data stream with the highest received power first.

Figure 23:
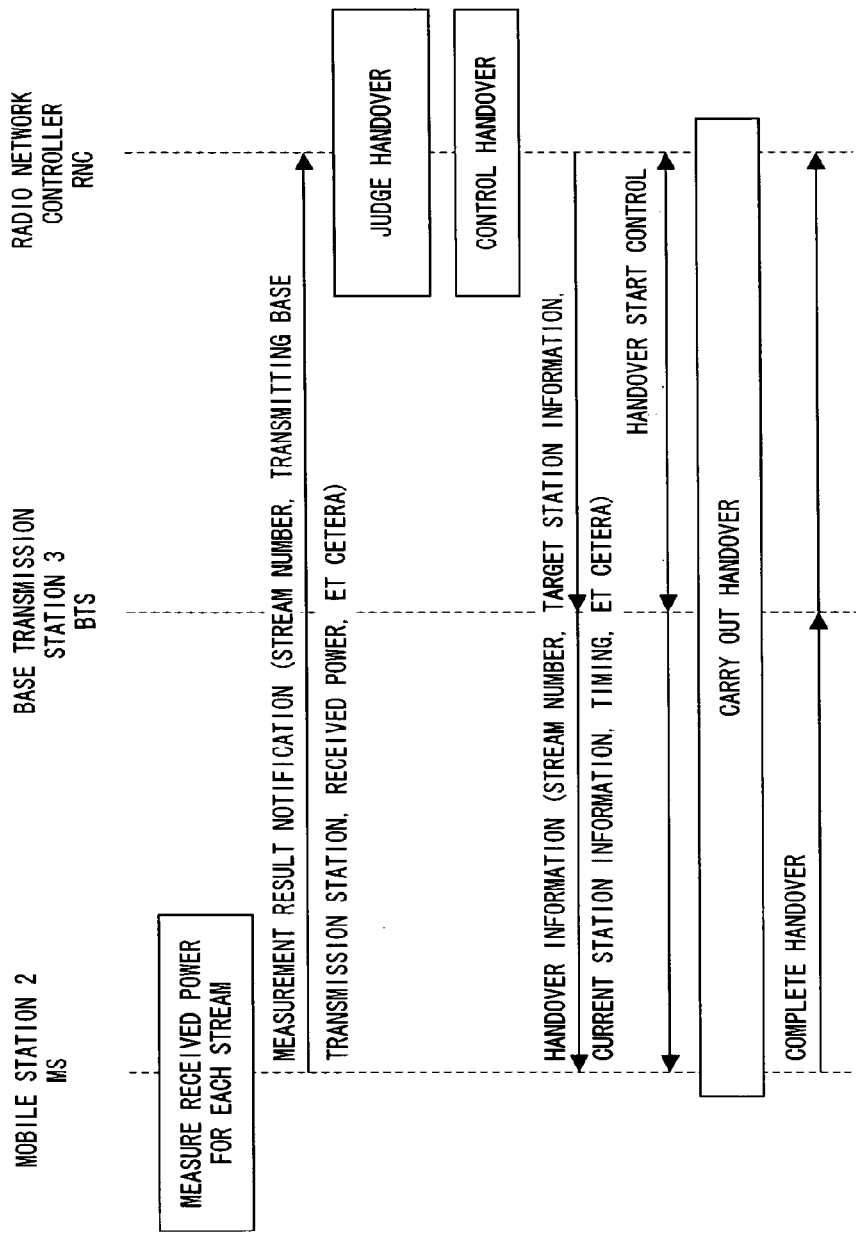
FIG. 23 is a control sequence chart (part 2) of a handover judgment processing.

FIG. 23 is a control sequence chart of a handover judgment processing in the case of the RNC judging a necessity of a handover. The description is focused on a different point compared to the case of the RNC judging a necessity of a handover, as already described in reference to FIG. 18.

Having measured a received power of each data stream, the mobile station 2 reports the measurement result by including it in a measurement result message to the RNC. The measurement result message includes a stream number, a transmitting base transmission station, received powers, et cetera, for example.

Having received the measurement result notification, the RNC judges a necessity of a handover for each data stream based on the information included therein as in the case of the mobile station 2 judging it based on the received power as shown by FIG. 18. For the data stream judged as a handover being necessary in the aforementioned judgment, a notification of handover information is transmitted to the target base transmission station, the current base transmission station and the mobile station 2, and then a handover processing is carried out in the same way as the previously described method in the ensuing process.

The handover judgment processing carried out by the mobile station 2 and the RNC, respectively, in the process shown by FIGS. 18 and 23, may be performed by a base transmission station 3. If the base transmission station 3 judges a necessity of a handover, the sequence thereof is for it to receive information including a received power for each data stream measured at the mobile station 2 therefrom. As the base transmission station 3 judges a necessity of a handover based on the received information, thus judging a handover being necessary, the handover control information shown by FIGS. 19 and 20A through 20D is transmitted as a notification to the RNC, the mobile station 2 and the target base transmission station. Then a handover per data stream is carried out based on the notified handover control information.

Note that the above description utilizes a received power for judging a necessity of a handover, but it is not limited as such. For example, a received field intensity or a received quality such as SIR (i.e., a signal to interference power ratio) may be used instead. The following description also utilizes a received power for judging a necessity of a handover, but it is also possible to carry out the same handover by using a received field intensity or a received quality.

The above described embodiment exemplifies a transmission from the base transmission station 3 to the mobile station 2, but it is not limited as such. For example, it is possible to apply the above described handover method to a transmission from a mobile station 2 to a base transmission station 3, or that between mobile stations 2. Note that the following description is the same in terms of not being limited to the transmission from the base transmission station 3 to the mobile station 2.

Second Embodiment

Figure 24:
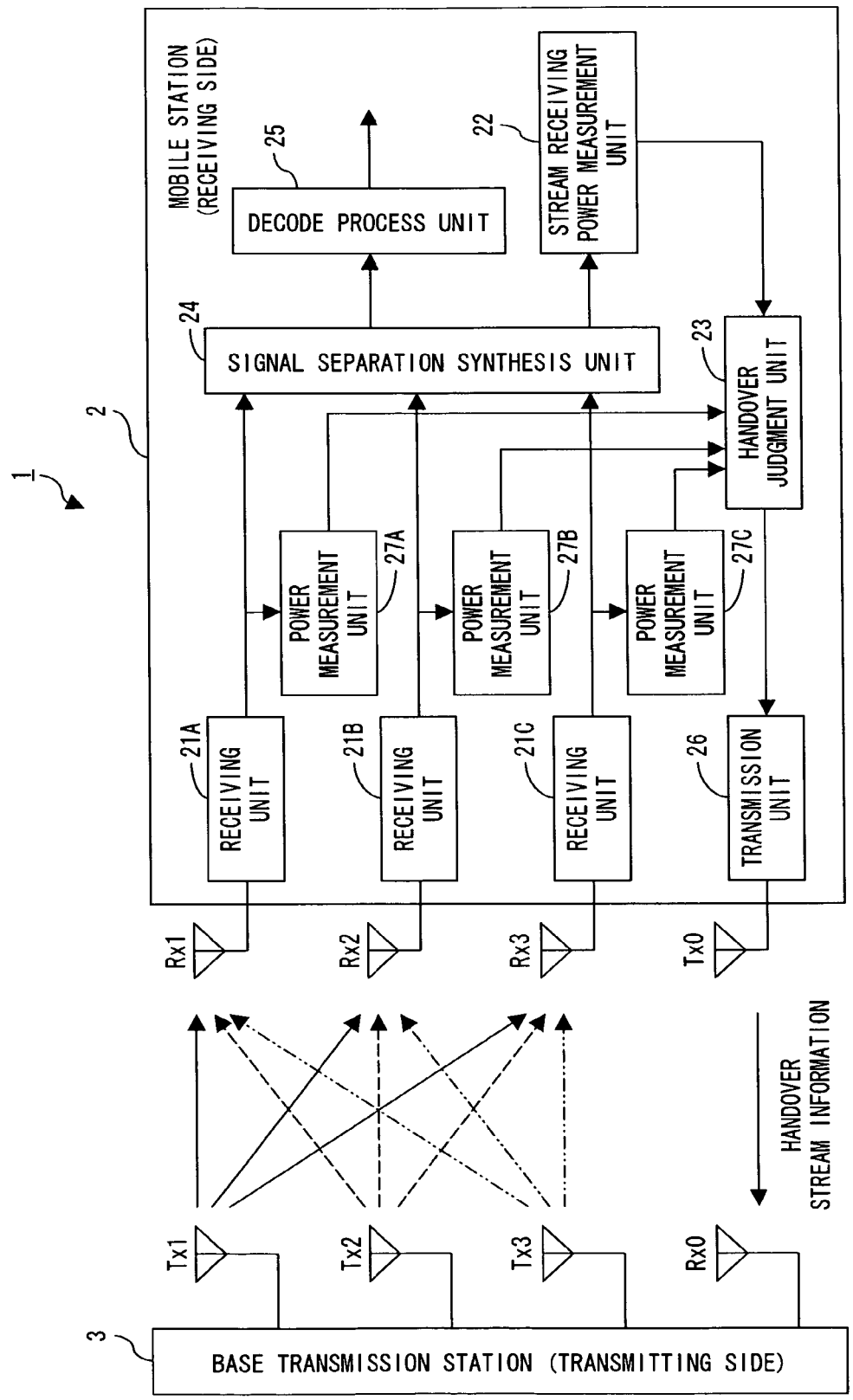
FIG. 24 shows a comprisal of a mobile station carrying out a handover according to a second embodiment.

FIG. 24 shows a comprisal of the mobile station 2 carrying out a handover according to the second embodiment. The description is of a different point as compared to the comprisal of the mobile station 2 according to the first embodiment shown by FIG. 13. Note that the base transmission station 3 for carrying out a handover according to the present embodiment is the same as that of the base transmission station according to the first embodiment as shown by FIG. 15, and therefore a description thereof is omitted here.

The mobile station 2 according to the second embodiment shown by FIG. 24 differs from the mobile station 2 according to the first embodiment where the former comprises received power measurement units 27 (27A, 27B and 27C) for measuring a received power of a received pilot signal received by way of each antenna Rx. The received power measurement units 27A, 27B and 27C measure the received powers of signals received by way of respective antennas and provide the measurement results to the handover judgment unit 23 which then calculates a sum of the received power (a total received power) provided by each received power measurement unit 27 and determines a target base transmission station. The process of determining which data stream to carry out a handover for among a plurality thereof is decided based on the measurement result of the stream received power measurement unit 22, which is the same as the first embodiment.

Figure 25:
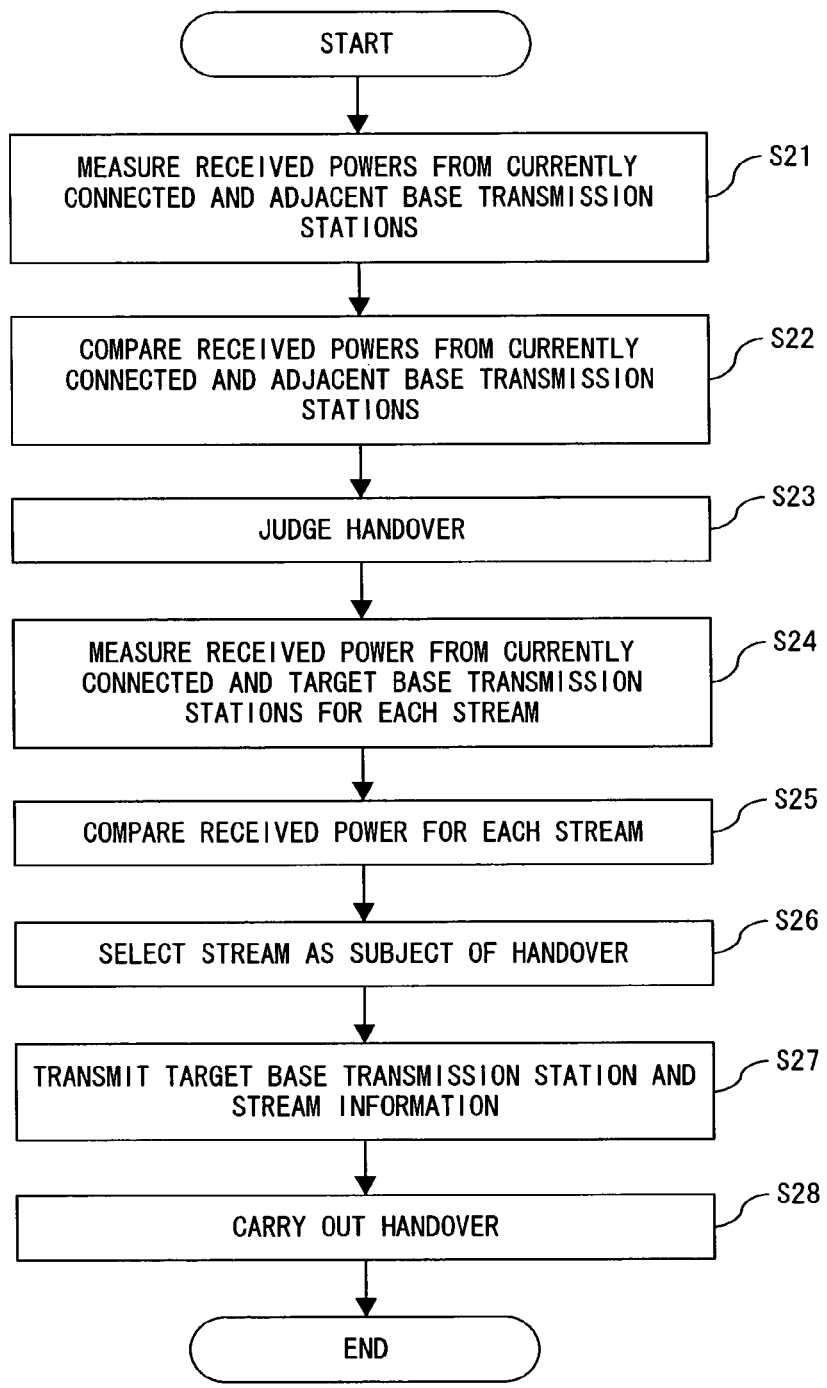
FIG. 25 is a flow chart of a handover processing according to the second embodiment.

FIG. 25 is a flow chart of a handover processing according to the present embodiment. The processing shown by FIG. 25 is carried out every time the mobile station 2 receives a pilot signal, transmitted from the base transmission station 3 at a predetermined time interval. The following description is of a handover method according to the present embodiment referring to FIG. 25.

First, the step S21 is for the received power measurement unit 27 to measure a total received power from the currently connected base transmission station $BTS_{3a}$ and the nearby base transmission stations $BTS_{3b}$ through $BTS_{3n}$. The step S22 is to determine a base transmission station $BTS_{3h}$ with the maximum received power by comparing the values of each total received power. The step S23 is to compare the total received power $P_{bts3h}$ from the base transmission station $BTS_{3h}$ with the total received power $P_{bts3a}$ from the currently connected base transmission station $BTS_{3a}$ and, if the $P_{bts3h}$ is larger than $P_{bts3a}$, the judgment is that it is necessary to carry out a handover.

In the step S24, the stream received power measurement unit 22 measures a received power for each data stream from the currently connected base transmission station $BTS_{3a}$ and the base transmission station $BTS_{3h}$ which is judged as the target station in the step S23. The step S25 is to compare the received power from the base transmission station $BTS_{3a}$ with that from the base transmission station $BTS_{3h}$ for each data stream; and, if the received power from the base transmission station $BTS_{3h}$ is the largest, then the step S26 is to judge that a handover for the data stream is necessary. The step 27 is to report the handover control information relating to the base transmission station $BTS_{3h}$ and data stream to the RNC via the base transmission station $BTS_{3a}$, and the step S28 is to carry out a handover based on the report to end the processing.

In the steps S25 and S26, the process of selecting a data stream to have a handover carried out by comparing the received power is the same as a series of processes according to the first embodiment as shown by FIG. 17. The difference lies in that a target base transmission station that is common to a data stream, for which a handover is carried out, is judged based on the value of the total received power.

As described above, according to the present embodiment, a handover is carried out for a data stream for which a handover is necessary and for a base transmission station with a larger received power than the currently connected base transmission station. The benefit is that a handover is carried out to the common base transmission station for each data stream instead of carrying out a handover to a different base transmission station therefor, in addition to the benefit of the handover method according to the above described embodiment. That is, there is no possibility of connections between three or more base transmission stations and a mobile station at the time of a handover per stream, and therefore an improved efficiency of data transmission can be expected.

Third Embodiment

A handover method according to this embodiment is the same as in the case of the second embodiment where the path for a data stream to carry out a handover is switched to a common target base transmission station, while the difference from the second embodiment is that a target station is determined based on statistical data of the optimal target base transmission station for each data stream. Since the comprisals of the mobile station 2 and base transmission station 3 according to the present embodiment are the same as in the case of the first embodiment, descriptions of them are omitted in the following description of a handover method according to the present embodiment.

Figure 26:
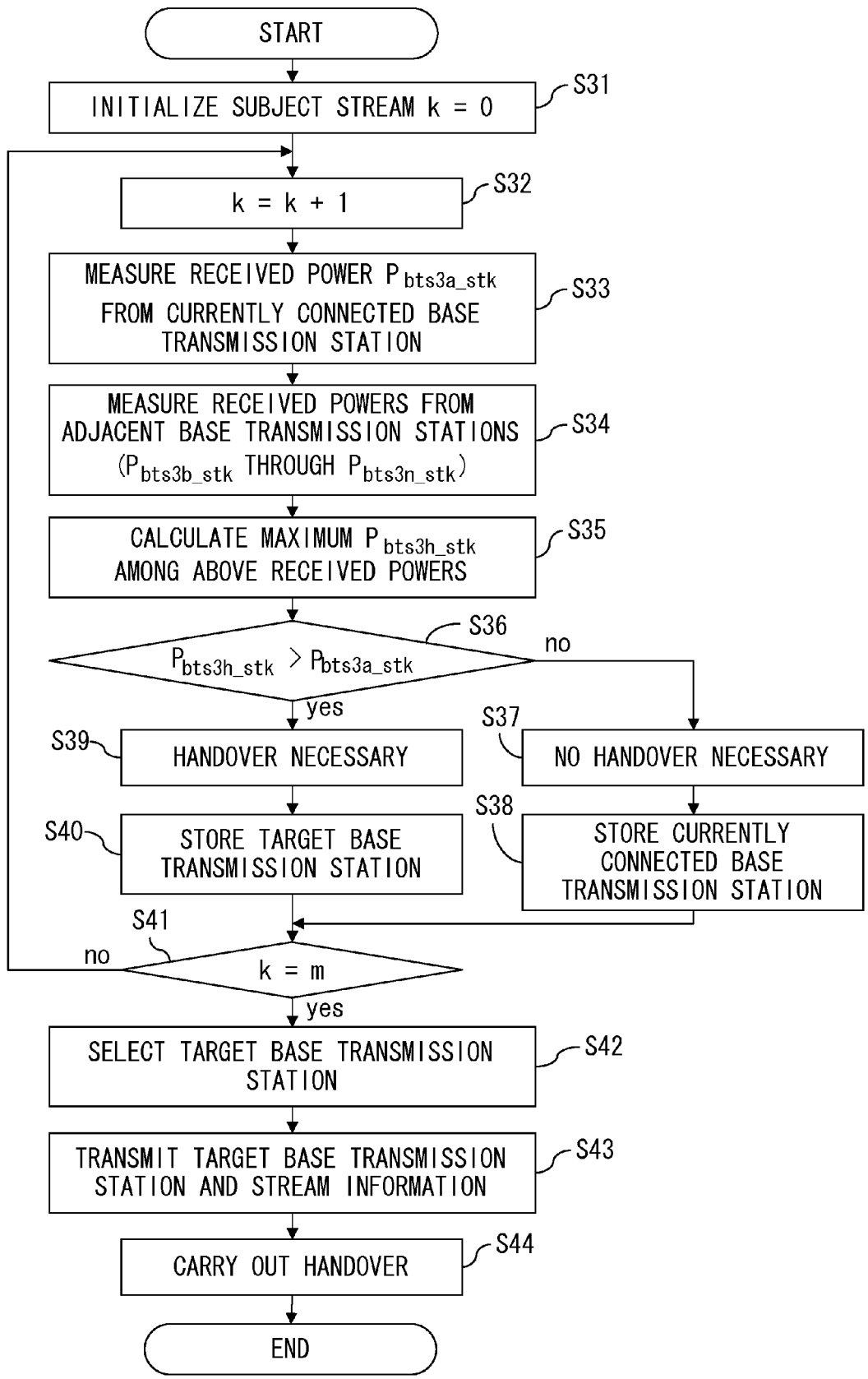
FIG. 26 is a flow chart of a handover processing according to a third embodiment.

FIG. 26 is a flow chart of a handover processing according to the third embodiment. The processing shown by FIG. 26 is executed at the time of receiving a pilot signal from the base transmission station 3 as in the case of the processes shown by FIGS. 17 and 25. Note that the flow chart shown by FIG. 26 is for the case of the number of simultaneously transmitted data streams being "m".

First, the step S31 is to initialize, to zero ("0"), a stream number k for identifying each data stream. The step S32 is to increment the stream number k and the step S33 is to measure a received power $P_{bts3a\_stk}$ of the data stream by the stream number k from the currently connected base transmission station $BTS_{3a}$. The step S34 is to measure the received powers $P_{bts3b\_stk}$ through $P_{bts3n\_stk}$ of the data stream with the stream number k from the nearby base transmission stations $BTS_{3b}$ through $BTS_{3n}$, and the step S35 is to calculate the maximum received power $P_{bts3h\_stk}$ among the $P_{bts3a\_stk}$ through $P_{bts3n\_stk}$.

The step S36 is to compare the maximum received power $P_{bts3h\_stk}$ with the received power $P_{bts3a\_stk}$ from the currently connected base transmission station $BTS_{3a}$. If the value of the received power $P_{bts3a\_stk}$ exceeds that of the maximum received power $P_{bts3h\_stk}$, the process proceeds to the step S37 judging that no handover is necessary for the data stream and in the step S38 storing the currently connected base transmission station "$BTS_{3a}$" as the selected target base transmission station. Having stored it, the process proceeds to the step S41. Here, the selected target base transmission station means a candidate base transmission station for a common target base transmission station for the data stream at the time of carrying out a handover.

If the maximum received power $P_{bts3h\_stk}$ exceeds the received power $P_{bts3a\_stk}$ from the currently connected $BTS_{3a}$, then the process proceeds from the step S36 to the step S39, judging that a handover is necessary. The step S40 is to store the base transmission station "$BTS_{3h}$" with the maximum received power as the selected target base transmission station, and the process proceeds to the step S41.

The step S41 is to judge whether or not the processes in the steps S33 through the step S38, or through the step S40 are completed for all the data streams and repeat the processes in the step S32 and thereafter until the processes for the data stream with the stream number k is equal to m (k=m).

FIG. 27A exemplifies a selected target base transmission station stored in the steps S38 and S40. The table stores a base transmission station with the maximum received power, as the selected base transmission station, for each data stream correlated therewith.

The step S42 is to determine a target base transmission station by referring to the selected target base transmission station for each data stream. The present embodiment is configured to determine the most selected base transmission station as the target base transmission station. For example, the data table shown by FIG. 27A indicates that the base transmission station $BTS_{3b}$ is stored as the most "selected base transmission station", and therefore the base transmission station $BTS_{3b}$ is selected as the target base transmission station.

The processes in the steps S43 and S44 correspond to, and are the same as, those in the steps S27 and S28 shown by FIG. 25, and therefore descriptions thereof are omitted herein. FIG. 27B exemplifies a received power from the base transmission station determined in the previous step as the target base transmission station for each stream. The step S44 is enabled to carry out a handover in the sequence of the data stream with the highest, or the lowest, received power from among the received powers from those base transmission stations for which handovers are to be actually carried out as shown by FIG. 27B.

According to the present embodiment as described above, a common target base transmission station is selected instead of the different target base transmission stations for each of the data streams, with the each target base transmission station being selected based on the received power of each data stream. That is, a handover is carried out to the common target base transmission station according to the state of a data stream therefor to be handed over to.

Incidentally, as to which data stream to carry out a handover for from among those data streams for which a handover is judged to be necessary, the data stream with the highest received power, or the lowest, may be given priority for example. In another method, subtracting the received power $P_{bts3a\_stk}$, of the currently connected base transmission station, from the received power $P_{bts3x\_stk}$ of a adjacent base transmission station $BTS_{3x}$, and determining the sequence of carrying out a handover based on the difference of the received powers $P_{diff\_stk} = P_{bts3x\_stk} - P_{bts3a\_stk}$ may be possible.

Fourth Embodiment

A handover method according to this embodiment differs from the above described embodiment in that the former sets a threshold value for each data stream in advance and judges a handover is necessary when the difference of a received power from the currently connected base transmission station and that from a adjacent base transmission station exceeds the threshold value.

Figure 28:
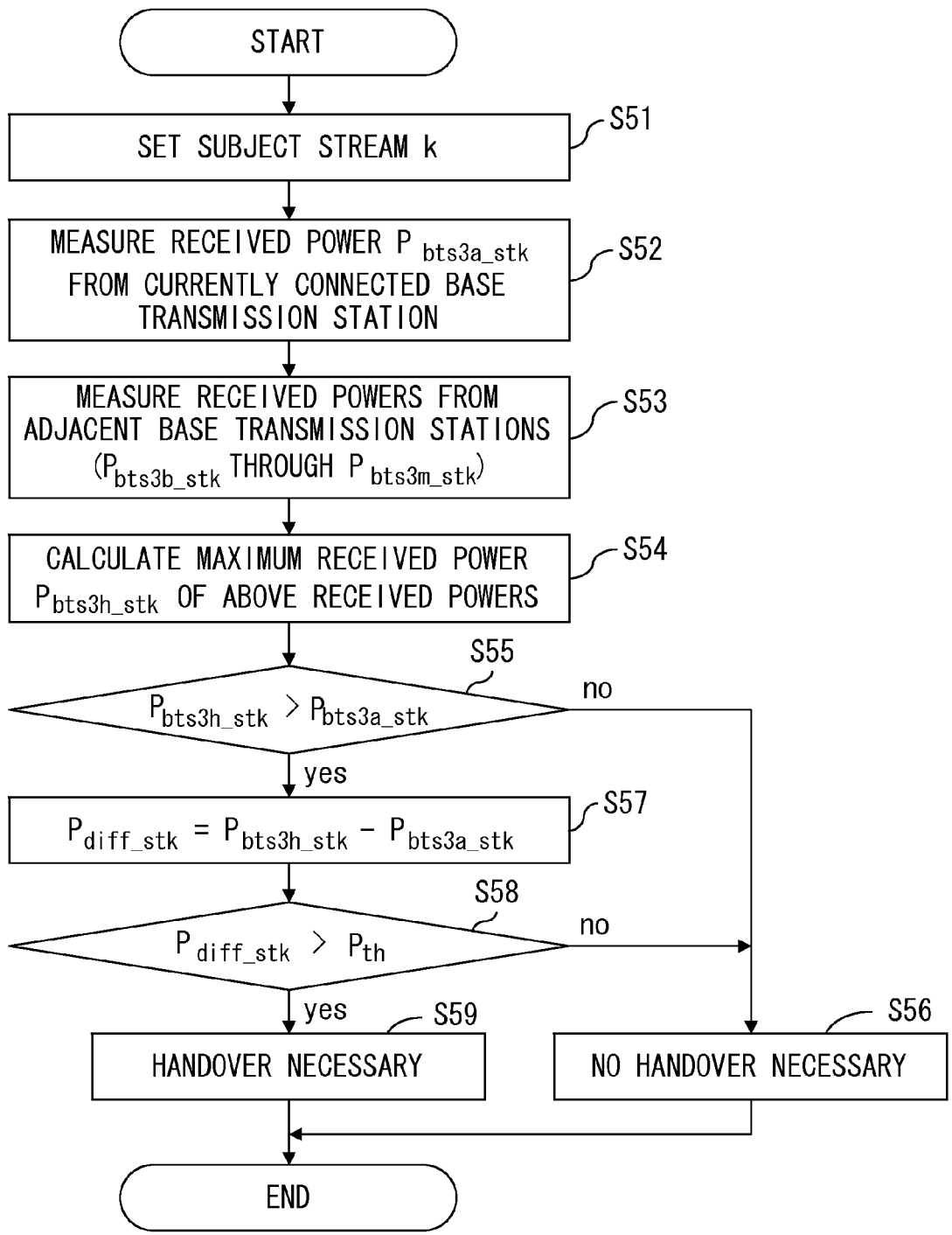
FIG. 28 is a flow chart of a handover processing according to a fourth embodiment.

FIG. 28 is a flow chart of a handover processing according to the fourth embodiment. The above described threshold set for judging a handover is defined as $P_{th}$. The timing for starting the processing shown by FIG. 28 is at the time of receiving a pilot signal as with the processes shown by FIGS. 17, 25 and 26. The processes in the steps S51 through S55 and S56 correspond to the steps S1 through S5 and S7 shown by FIG. 17, carrying out the same processes, respectively, and therefore descriptions thereof are omitted herein.

The step S57 is to calculate the difference $P_{diff\_stk}$ between received powers as noted in the description of the third embodiment. The step S58 is to compare the size of the difference $P_{diff\_stk}$ and the threshold value $P_{th}$. If the threshold value $P_{th}$ is exceeded by the difference $P_{diff\_stk}$, the process proceeds to the step S59, judging that a handover is necessary, while if the difference $P_{diff\_stk}$ is at the threshold value $P_{th}$ or less, then the process proceeds to the step S56, judging that a handover is not necessary, followed by ending the processing.

According to the handover method of the present embodiment, a handover is judged as being un-necessary until the difference between the received power from the currently connected base transmission station and the received powers from the adjacent base transmission stations exceeds a pre-determined magnitude. This makes it possible to prevent handovers from being carried out excessively frequently, in addition to the benefit of the handover according to the above described embodiments.

Note that the above described example assumes a common threshold value being set, but the same benefit is obtained as the handover method according to the present embodiment if a different threshold value $P_{th\,(k)}$ is set for each stream.

Fifth Embodiment

A handover method according to this embodiment is configured to perform diversity transmission for a data stream from a base transmission station after carrying out either of the handover methods according to the above described embodiments by taking advantage of the fact that the number of data streams is reduced in the aforementioned base transmission station (i.e., a part of the resources for transmitting data (e.g., a part of the plurality of antennas) assuming a state of not being used). The following description of the handover method according to the present embodiment, refers to the accompanying drawing.

Figure 29:
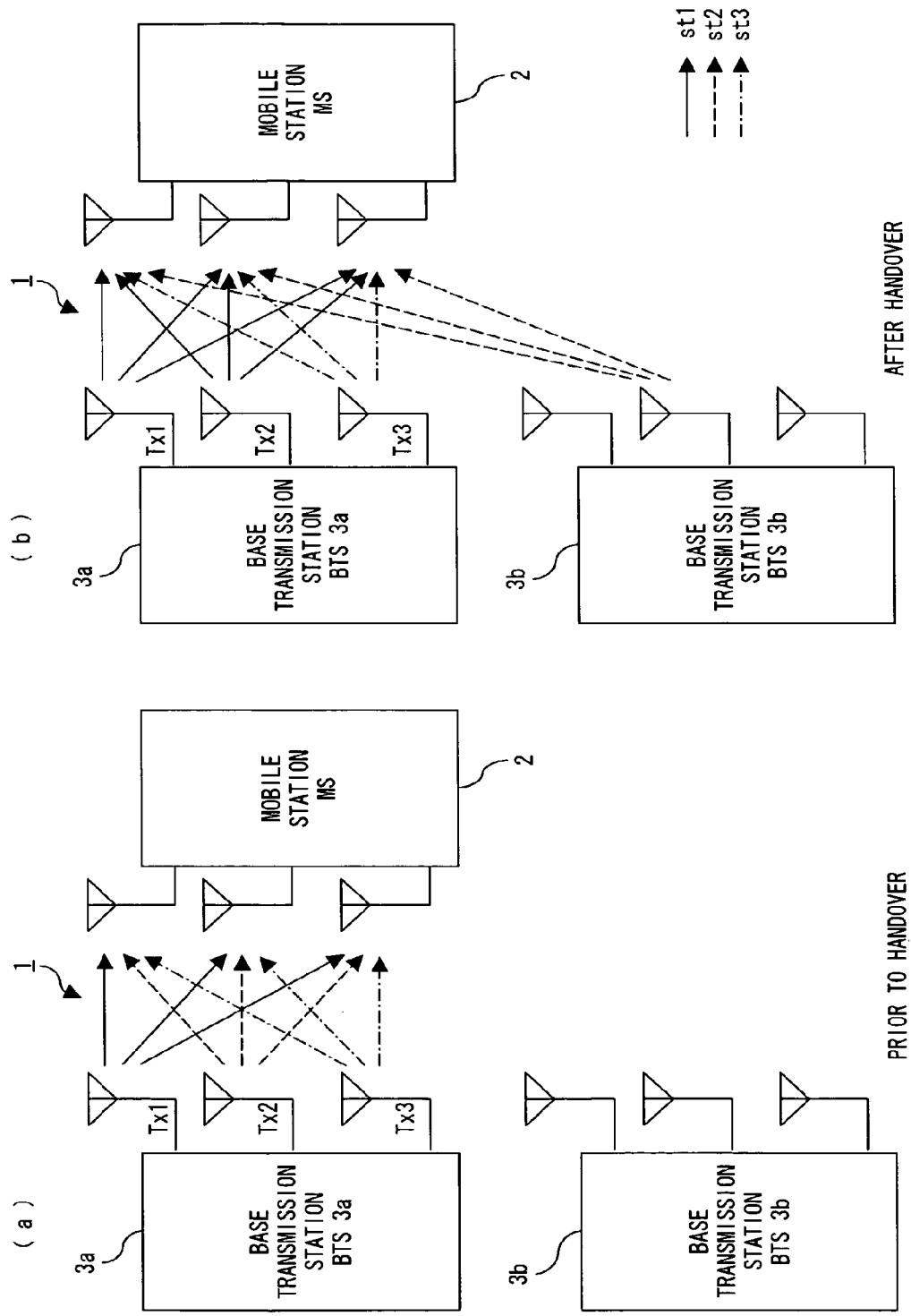
FIG. 29 illustrates a handover method according to a fifth embodiment.

FIG. 29 illustrates a handover method according to the fifth embodiment. As shown by FIG. 29 (a), the base transmission station $BTS_{3a}$ transmits three data streams $st_1$, $st_2$ and $st_3$ simultaneously to the mobile station 2 prior to a handover. Assuming that, having carried out a handover by either of the above described handover methods according to the first through fourth embodiments, the data stream $st_2$ is changed over to a transmission via the adjacent base transmission station $BTS_{3b}$.

The antenna $Tx_2$ of the base transmission station $BTS_{3a}$ is unused as a result of the change over to the transmission via the adjacent base transmission station $BTS_{3b}$. As shown by FIG. 29 (b), a diversity transmission is performed for a data stream for which a handover is not carried out at the base transmission station $BTS_{3a}$ by using the antenna $Tx_2$ which has become unused as a result of the handover. In the example shown by FIG. 29 (b), a diversity transmission is performed for the data stream $st_1$ which used to be transmitted by way of the antenna $Tx_1$. By the diversity transmission, the same data stream $st_1$ is transmitted to the mobile station 2 by way of the antennas $Tx_1$ and $Tx_2$ of the base transmission station $BTS_{3a}$. This configuration makes it possible to improve the transmission quality of the data stream $st_1$ at the time of a handover according to the above described embodiment, and also increase the transmission speed as a result of improving the transmission quality.

Meanwhile, as for a selection of a data stream as the subject of the diversity transmission, a configuration may be to select a data stream with a large received power, or with a small received power, at the mobile station 2. Or, if there is an attribute of transmission data, that is, a QoS (quality of service) such as the maximum delay time and the desired transmission quality, for each data stream is different, then the selection may be based on the attribute.

Sixth Embodiment

This embodiment changes over the method for a data transmission from a MIMO transmission to a diversity transmission according to a telecommunication environment, et cetera.

Figure 30:
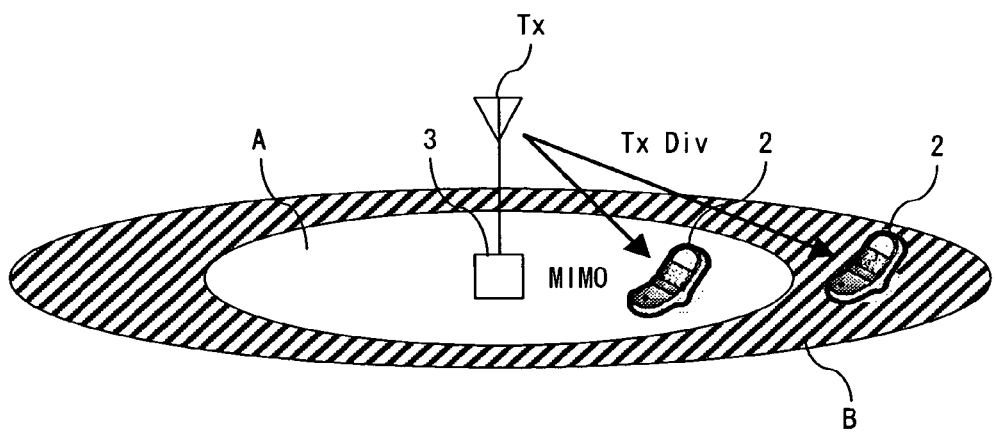
FIG. 30 is a conceptual diagram of a system configuration according to a sixth embodiment.

FIG. 30 is a conceptual diagram of a system configuration according to the sixth embodiment. The area A is a cell area relatively close to the base transmission station 3, while the area B is a cell area relatively far from a base transmission station. If the mobile station 2 is in the area A, a received power therein is large, thus good telecommunication quality is anticipated. With the mobile station 2 moving to the area B, the received power at the mobile station 2 decreases, hence a decreased telecommunication quality is anticipated. The present embodiment is configured to change over from a data telecommunication by the MIMO to that by a diversity transmission per stream one after another based on the received powers, et cetera, for example, in an environment where a decreased telecommunication quality is anticipated.

Figure 31:
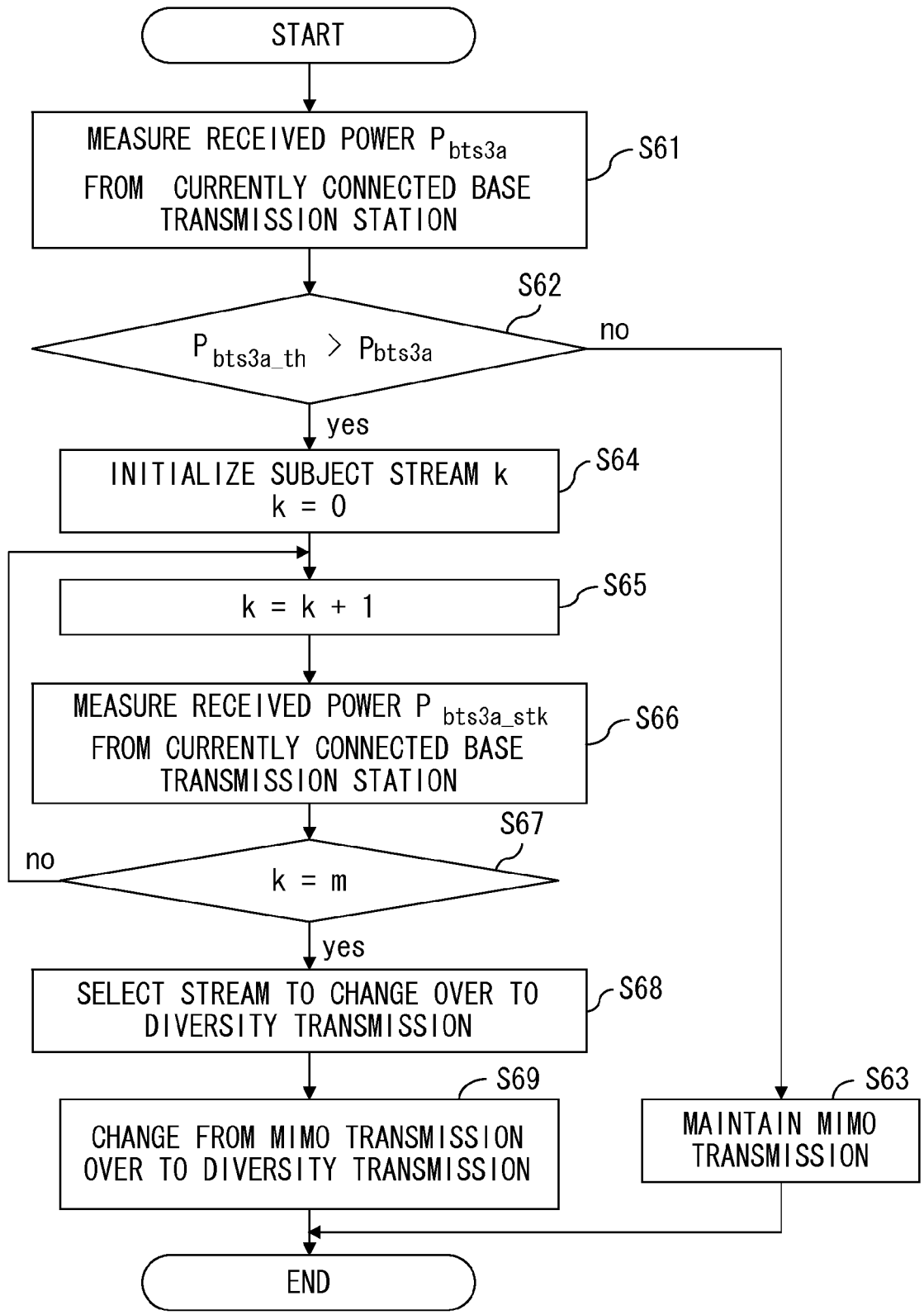
FIG. 31 is a flow chart of a transmission method changeover processing according to the sixth embodiment.

FIG. 31 is a flow chart of a transmission method changeover processing according to the present embodiment. The processing shown by FIG. 31 is started at the timing of the mobile station 2 receiving a pilot signal from the base transmission station 3 as in the case of the above described embodiments.

First, the step S61 is to measure a received power from the currently connected base transmission station ($BTS_{3a}$), which measures a total (defining $P_{bts3a}$) of the power received by each antenna of the mobile station 2. The next step S62 is to compare a predetermined threshold $P_{bts3a\_th}$ which is set for the base transmission station $BTS_{3a}$ with the received power $P_{bts3a}$. If the received power $P_{bts3a}$ is the same as, or greater than, the threshold value $P_{bts3a\_th}$, the process proceeds to the step S63 and continues the telecommunication by the MIMO, ending the processing. If the received power $P_{bts3a}$ is smaller than the threshold value $P_{bts3a\_th}$, the process proceeds to the step S64 and initialize the stream number k to zero ("0"), followed by proceeding to the step S65. The processes in the steps S65 through S67 are repeated until the received powers $P_{bts3a\_stk}$ from the currently connected base transmission station $BTS_{3a}$ for the data stream with the stream number k are measured for all data streams. FIG. 31 exemplifies the case of the m-number of data streams.

The step S68 is to compare the received powers of data streams, thereby selecting a data stream to be changed from the MIMO telecommunication over to the diversity transmission; and the step S69 is to change the selected data stream to the telecommunication by the diversity transmission, followed by ending the processing.

Note that the above described example judges which of the MIMO or diversity transmission to select for a transmission based on the magnitude of the received power, however the configuration is not limited as such. For example, the judgment may be made in consideration of both the received power and a reception quality such as SIR.

Also, in the step S62 the judgment of whether or not the transmission method for the data stream is to be changed from the transmission by the MIMO to that of the diversity transmission is based on the measurement of a received power independent of a stream, but the configuration is not limited as such. For example, a threshold value $P_{th\ (k)}$ may be prepared for a data stream with the stream number k and the judgment may be made based on a magnitude relationship with a received power $P_{bts3a\_stk}$ corresponding to the threshold $P_{th\ (k)}$.

As described above, the present embodiment makes it possible to transmit a data stream by a telecommunication method according to the telecommunication environment even in the case of a reduced received power occurring, hence contributing to maintaining a telecommunication quality.

What is claimed is:

1. A wireless telecommunication method in a receiving apparatus receiving a plurality of different streams including data to be transmitted, which is divided into first data and second data, the first data and the second data being different from one another, the wireless telecommunication method comprising:
   receiving by the receiving apparatus a first stream, which is one of the plurality of different streams transmitted from a first transmission apparatus and includes the first data, and a second stream, which is one of the plurality of different streams and includes the second data which is different from the first data;
   performing by the receiving apparatus a measurement of reception quality or received power in each of the plurality of different streams, and notifying by the receiving apparatus the first transmission apparatus of a result of the measurement; and receiving by the receiving apparatus the second stream from a second transmission apparatus while receiving the first stream from the first transmission apparatus when a handover is carried out, wherein the plurality of different streams correspond to a plurality of different pieces of information in a space multiple transmission.

2. The wireless telecommunication method according to claim 1, wherein in a case of carrying out the handover, the receiving apparatus simultaneously receives the first stream from the first transmission apparatus and the second stream from a second transmission apparatus, and wherein the receiving apparatus includes handover information to switch from the first data to the second data with the second data being data subsequent to the first data.

3. The wireless telecommunication method according to claim 2, wherein the handover information includes an end of the first data such that all of the first data is received prior to using the second data.

4. A wireless telecommunication system for transmitting, from a transmission apparatus to a receiving apparatus, a plurality of different streams including data to be transmitted, which is divided into first data and second data, the first data and the second data being different from one another, the wireless telecommunication system comprising:

a first transmission unit that is equipped in a first transmission apparatus and transmits a first stream, the first stream being one of the plurality of different streams and including the first data;

a second transmission unit that is equipped in a second transmission apparatus and transmits a second stream including the second data, the second data being different from the first data;

a receiving unit that is equipped in the receiving apparatus and receives the first stream and the second stream;

a measurement unit that is equipped in the receiving apparatus, performs a measurement of reception quality or received power in each of the plurality of different streams, and notifies the first transmission apparatus of a result of the measurement, wherein the receiving unit receives the second stream from the second transmission apparatus while receiving the first stream from the first transmission apparatus when a handover is carried out, and the plurality of different streams correspond to a plurality of different pieces of information in a space multiple transmission.

5. A receiving apparatus for receiving a plurality of different streams including data to be transmitted, which is divided into first data and second data, the first data and the second data being different from one another, the receiving apparatus comprising:

a receiving unit that receives a first stream, which is one of the plurality of different streams transmitted from a first transmission apparatus and includes the first data, and a second stream, which is one of the plurality of different streams and includes the second data which is different from the first data; and a measurement unit that performs a measurement of reception quality or received power in each of the plurality of different streams and notifies the first transmission apparatus of a result of the measurement, wherein the receiving unit receives the second stream from a second transmission apparatus while receiving the first stream from the first transmission apparatus when a handover is carried out, and the plurality of different streams correspond to a plurality of different pieces of information in a space multiple transmission.

6. A wireless telecommunication system for transmitting a plurality of different streams from a transmission apparatus having a plurality of antennas to a receiving apparatus having a plurality of antennas, the plurality of different streams including data to be transmitted, which is divided into first data and second data, the first data and the second data being different from one another, the wireless telecommunication system comprising:

a transmission unit that is equipped in the transmission apparatus and transmits the plurality of different streams from the transmission apparatus via the plurality of antennas;

a receiving unit that is equipped in the receiving apparatus and receives the plurality of different streams transmitted via the plurality of antennas;

a measurement unit that is equipped in the receiving apparatus, performs a measurement of reception quality or received power in each of the plurality of different streams, and notifies the first transmission apparatus of a result of the measurement; and a handover unit that is equipped in the transmission apparatus and carries out a handover, wherein when the changeover unit carries out the handover while the receiving unit receives the plurality of different streams from a first transmission apparatus, the receiving apparatus receives a stream that is changed over in the handover from a second transmission apparatus while receiving a stream that is not changed over in the handover from the first transmission apparatus, and the plurality of different streams correspond to a plurality of different pieces of information in a space multiple transmission.

7. The wireless telecommunication system according to claim 6, wherein the handover unit carries out the handover for remaining streams after carrying out the handover for a fewer number of streams than the plurality of different streams.

8. The wireless telecommunication system according to claim 6, wherein the handover unit changes between a state of each transmission antenna transmitting a mutually different stream for each of the streams and a state of transmitting by a diversity transmission according to a measurement result by the measurement unit after carrying out a handover for a fewer number of streams than the plurality of the different streams.

9. The wireless telecommunication system according to claim 4, further comprising a diversity unit that carries out a diversity transmission by using an antenna that becomes unused after carrying out the handover for a fewer number of streams than the plurality of different streams, and an antenna used for transmitting streams for which the handover is not carried out.

10. A transmission apparatus having a plurality of antennas to transmit a plurality of different streams including data to be transmitted, which is divided into first data and second data, the first data and the second data being different from one another, the transmission apparatus comprising:

a transmission unit that transmits the plurality of different streams;

a receiving unit that receives, from a receiving apparatus, a result of a measurement of reception quality or received power for each of the plurality of different streams measured by the receiving apparatus; and a handover unit that carries out a handover for at least one of the a plurality of different streams, wherein the plurality of different streams correspond to a plurality of different pieces of information in a space multiple transmission.

11. A receiving apparatus having a plurality of antennas to transmit a plurality of different streams including data to be transmitted, which is divided into first data and second data, the first data and the second data being different from one another, the receiving apparatus comprising a receiving unit that receives the plurality of different streams transmitted from a plurality of antennas of a transmission apparatus; and a measurement unit that performs a measurement of reception quality or received power in each of the plurality of different streams and notifies the first transmission apparatus of a result of the measurement, wherein the receiving unit receives a first stream, which is one of the plurality of different streams transmitted from a first transmission apparatus and includes the first data, and a second stream, which is one of the plurality of different streams and includes the second data which is different from the first data, the receiving unit receives a second stream from a second transmission apparatus while receiving a first stream from the first transmission apparatus when a handover is carried out, and the plurality of different streams correspond to a plurality of different pieces of information in a space multiple transmission.

12. A wireless telecommunication method for transmitting a plurality of different streams from a transmission apparatus having a plurality of antennas to a receiving apparatus having a plurality of antennas, the plurality of different streams including data to be transmitted, which is divided into first data and second data, the first data and the second data being different from one another, the wireless telecommunication method comprising:

transmitting by a transmission apparatus the plurality of different streams from the transmission apparatus via the plurality of antennas;

receiving by the receiving unit the transmitted plurality of different streams via the plurality of antennas;

performing by the receiving unit a measurement of reception quality or received power in each of the plurality of different streams, and notifying by the receiving unit the first transmission apparatus of a result of the measurement; and carrying out a handover, wherein when the handover is carried out while receiving the plurality of different streams from a first transmission apparatus, the receiving apparatus receives a stream that is changed over in the handover from a second transmission apparatus while receiving a stream that is not changed over in the handover from the first transmission apparatus, and the plurality of different streams correspond to a plurality of different pieces of information in a space multiple transmission.

13. The wireless telecommunication method according to claim 12, further comprising carrying out the handover for remaining streams after carrying out the handover for a fewer number of streams than the plurality of different streams.

14. The wireless telecommunication method according to claim 12, wherein in a case of carrying out the handover, the receiving apparatus simultaneously receives a first stream from the first transmission apparatus and a second stream from a second transmission apparatus.

15. The wireless telecommunication method according to claim 14, wherein the receiving apparatus includes information to switch from the first data to the second data.

* * * * *